(12) United States Patent
Sugawara et al.

(10) Patent No.: US 7,547,481 B2
(45) Date of Patent: *Jun. 16, 2009

(54) FUEL-CIRCULATING FUEL CELL SYSTEM

(75) Inventors: Tatsuya Sugawara, Saitama (JP); Hiroshi Shimanuki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 266 days.

This patent is subject to a terminal disclaimer.

(21) Appl. No.: 10/300,479

(22) Filed: Nov. 20, 2002

(65) Prior Publication Data

US 2003/0096145 A1  May 22, 2003

(30) Foreign Application Priority Data

Nov. 20, 2001  (JP) .............................. 2001-354530

(51) Int. Cl.
*H01M 8/04* (2006.01)
(52) U.S. Cl. .............................. 429/22; 429/23; 429/34
(58) Field of Classification Search .................. 429/12, 429/13, 17, 19, 20, 22, 23, 26, 34, 38; 48/127.9; 180/65.3
See application file for complete search history.

(56) References Cited

U.S. PATENT DOCUMENTS

| 5,170,124 | A * | 12/1992 | Blair et al. ................ 324/434 |
| 6,663,990 | B2 | 8/2001 | Iio et al. |
| 6,500,571 | B2 * | 12/2002 | Liberatore et al. ............ 429/2 |
| 7,037,609 | B2 | 5/2006 | Sugawara et al. |
| 2002/0057066 | A1 * | 5/2002 | Autenrieth et al. ......... 318/101 |
| 2002/0094467 | A1 | 7/2002 | Nonobe et al. |
| 2002/0136942 | A1 * | 9/2002 | Kashiwagi ................... 429/34 |
| 2003/0148167 | A1 * | 8/2003 | Sugawara et al. ............. 429/34 |

FOREIGN PATENT DOCUMENTS

| DE | 10107127 A1 | 9/2001 |
| DE | 10201893 A1 | 9/2002 |
| JP | 07-240220 | 9/1995 |
| JP | 07240220 | * 9/1995 |

(Continued)

OTHER PUBLICATIONS

McCabe, Warren L., Unit operations of Chemical Engineering, McGraw-Hill, Inc., 1993, Fifth Edition, pp. 212 & 213.*

(Continued)

*Primary Examiner*—Patrick Ryan
*Assistant Examiner*—Robert Hodge
(74) *Attorney, Agent, or Firm*—Lahive & Cockfield, LLP; Anthony A. Laurentano

(57) ABSTRACT

A fuel cell stack 1 in a fuel-circulating fuel cell system is supplied with fuel and an oxidizing agent to generate electricity. The fuel discharged from the fuel cell stack 1 is supplied to the fuel cell stack 1 again through a fuel-circulating passage 6. In the fuel-circulating passage 6 is provided a fuel pump 3 powered from an outside source to circulate the fuel through the fuel-circulating passage 6 at a predetermined circulation rate. An ECU 4 transmits an output instruction value to the fuel cell stack 1 and regulates a circulation rate of the fuel in the fuel-circulating passage 6 according to the output instruction value.

12 Claims, 21 Drawing Sheets

[SIXTH EMBODIMENT]

| | FOREIGN PATENT DOCUMENTS | | | |
|---|---|---|---|---|
| JP | 08222256 A | * | 8/1996 |
| JP | 9-213353 A | | 8/1997 |
| JP | 09213353 | * | 8/1997 |
| JP | 2001-143732 A | | 5/2001 |
| JP | 2002-29701 A | | 1/2002 |
| WO | WO 96/20508 | | 7/1996 |

OTHER PUBLICATIONS

Official Translation of Patent Abstracts of Japan Nos. 09-213353 & 07-240220.*

Official English translation of Patent Abstracts of Japan 2001-143732.*

* cited by examiner

[FIRST EMBODIMENT]

[CONTROL FLOW OF FIRST EMBODIMENT]

[SECOND EMBODIMENT]

[CONTROL FLOW OF FOURTH EMBODIMENT]

[FIFTH EMBODIMENT]

FUEL-CIRCULATING FUEL CELL SYSTEM

BACKGROUND OF THE INVENTION

This invention relates to fuel-circulating fuel cell systems and more particularly to a hydrogen-circulating mechanism in fuel cell systems.

In the fuel cell system, hydrogen and air should be supplied more than fuel cells consume, so as to discharge condensed water in the fuel cells. Hydrogen is supplied from storage equipment such as a cylinder installed in a vehicle, and thus discharging unused hydrogen into the air would conspicuously impair the fuel efficiency of hydrogen. For that reason, systems for circulating unused hydrogen utilizing a pump or the like have been devised.

Methods for recycling hydrogen unused in a fuel cell fall roughly into two types.

The first type is a method of circulating hydrogen utilizing a fuel pump, in which an operating section that rotates and/or slides is used to collect and feed fuels. This type will be hereinafter referred to as "fuel pump-using approach". However, this method would disadvantageously require a fuel pump of large size and high power consumption for driving the fuel pump, thus decreasing the fuel efficiency of a fuel-cell vehicle. Another problem associated with the fuel pump-using approach is that the pressure of hydrogen in a high-pressure hydrogen tank could not be utilized effectively.

The second type is a method of circulating hydrogen utilizing an ejector, or a kind of jet pump. This type will be hereinafter referred to as "ejector-using approach". This method employs energy generated from a high pressure in the high-pressure hydrogen tank to circulate hydrogen, and thus no power consumption is required. With the ejector-using approach, however, since circulation of hydrogen will not take place until the fuel cells consume hydrogen, the circulation rate of hydrogen would disadvantageously decrease when the output of the fuel cells is reduced. Further, the ejector has a nozzle inserted to generate velocity of hydrogen, which would thus cause a delay of the ejector in responding to an abruptly increased output of the fuel cells, with the result that the circulation rate disadvantageously could not reach a target value.

The problem encountered in the ejector-using approach will now be described in detail with reference to FIG. 20. FIG. 20 is a block diagram of a prevailing hydrogen-circulating system that only uses an ejector as a means for circulating hydrogen.

In this system, hydrogen supplied from a high-pressure hydrogen tank 101 undergoes pressure regulation by a regulator 102, and is then ejected by an ejector 103 to a fuel cell stack 104. The fuel cell stack 104 has been supplied with excessive amounts of hydrogen to discharge condensed water as described above. Hydrogen unused in the fuel cell stack 104 flows through a hydrogen-circulating passage 106 into the ejector 103, and circulates through the system together with hydrogen supplied from the high-pressure hydrogen tank 101. The system is configured to increase hydrogen pressure exercised upon the fuel cell stack 104 as the output of the fuel cell stack 104 increases.

In this system, when an abrupt acceleration instruction is given to the fuel cell stack 104, a huge amount of hydrogen is consumed rapidly in the fuel cell stack 104, and thereby the hydrogen pressure in the fuel cell stack 104 decreases. If hydrogen enough to make up the consumed amount could immediately be supplied, no problem would arise. However, there is a time lag between the decrease of pressure in the fuel cell stack 104 and the decrease of pressure transmitted through a hydrogen flow passage 107 to the ejector 103, and the response of the ejector 103 to the decrease of pressure in the fuel cell stack 104 would eventually delay. Moreover, the hydrogen is supplied through a narrowed nozzle of the ejector 103, and thus a predetermined period of time is required until the amount of hydrogen needed to be supplied to the fuel cells is reached.

The above situation is shown in FIG. 21A, which depicts an amount of hydrogen needed to be supplied to the fuel cell stack 104 (indicated by a broken line), and an amount of hydrogen actually supplied through the ejector 103 (indicated by a solid line), when an abrupt acceleration instruction is transmitted to the fuel cell stack 104.

As shown in FIG. 21A, after an abrupt acceleration instruction is provided, the amount of hydrogen to be supplied to the fuel cell stack 104 increases rapidly, but the amount of hydrogen actually supplied through the ejector 103 does not follow the rapid increase, resulting in deficiency of hydrogen (or so-called "hesitation"). The hesitation causes damage such as a rupture of electrolyte membranes of the fuel cells, and would lead to a destruction of the fuel cells if the worse came to the worst.

Further, when an abrupt deceleration instruction is given to the fuel cell stack 104, the system should control a hydrogen pressure exercised upon the fuel cell stack 104 to be reduced to a predetermined level. To that end, supply of hydrogen from the high-pressure hydrogen tank 101 to the fuel cell stack 104 is stopped, so that hydrogen in the fuel cell stack 104 is consumed. However, the stop of supply of hydrogen, which should have been introduced into the ejector 103, would disadvantageously disable the ejector 103 from circulating hydrogen. If hydrogen were not circulated smoothly, condensed water would accumulate in the fuel cell stack 104, which would thus decrease a cell voltage, and could lead to damage the fuel cell stack 104 at worst.

The above situation is shown in FIG. 21B, which depicts an amount of hydrogen needed to be supplied to the fuel cell stack 104 (indicated by a broken line), and an amount of hydrogen actually supplied through the ejector 103 (indicated by a solid line), under conditions where an abrupt deceleration instruction is given to the fuel cell stack 104.

When an abrupt deceleration instruction is given to the fuel cell stack 104, the fuel cell stack 104 needs hydrogen circulation as shown in the broken line, but in actuality the ejector 103 stops and no longer capable of circulating hydrogen, and thus hydrogen is held in the system. Under these conditions, condensed water generated in the fuel cell stack 104 cannot be removed; consequently, the condensed water accumulates in the fuel cell stack 104.

Moreover, as the conditions of the fuel cell stack 104 continuously change, operation of the hydrogen circulation system is disadvantageously unable to be optimized for the system unless the hydrogen circulation system is controlled in accordance with the varying conditions.

The present invention is made to eliminate the above-discussed disadvantages.

SUMMARY OF THE INVENTION

It is an exemplified general object of the present invention to provide a fuel-circulating fuel cell system that can avoid the disadvantageous situation where an amount of hydrogen circulating in a hydrogen circulation system temporarily falls below an amount required by the fuel cell system when an abrupt acceleration or deceleration instruction is provided to the fuel cells.

According to an exemplified first aspect of the present invention, there is provided a fuel-circulating fuel cell system comprising: a fuel cell that is supplied with fuel and an oxidizing agent, and generates electricity; a fuel-circulating passage that supplies fuel discharged from the fuel cell to the fuel cell again; a fuel-forwarding device that is disposed in the fuel-circulating passage, and provided with a fuel pump (powered from an outside source), or with a fuel pump and an ejector, to supply new fuel to the fuel-circulating passage and to circulate the fuel through the fuel-circulating passage at a predetermined circulation rate; and a fuel cell controller that transmits an output instruction value to the fuel cell and controls the fuel-forwarding device according to the output instruction value, to regulate a circulation rate of the fuel in the fuel-circulating passage.

With a conventional fuel cell system including a fuel-circulating system that utilizes an ejector only, the circulation rate of fuel is disadvantageously likely to become smaller than a specific level required by the fuel cells upon an abrupt acceleration/deceleration instruction.

With the first aspect of the present invention as described above, however, even if an abrupt acceleration/deceleration is transmitted to the fuel cells, the fuel cell controller evaluates a circulation rate of the fuel required by the fuel cells using the output instruction value, and exercises control for increasing the circulation rate of fuel by means of the fuel-forwarding device. Consequently, the amount of fuel required by the fuel cell system can be circulated through the fuel-circulating passage.

As the fuel-forwarding device, a fuel pump that is provided in the fuel-circulating passage and is supplied with a fuel to generate circulating momentum of the fuel may be utilized singly. Alternatively, such a fuel pump may be utilized in combination with an ejector that supplies new fuel stored in the high-pressure fuel tank or the like to the fuel-circulating passage to generate circulating momentum of fuel using the high pressure of the high-pressure fuel tank.

According to the above construction, even upon an abrupt acceleration/deceleration of the fuel cells, the fuel cell controller can regulate the fuel pump so that the rotation speed thereof may increase, and thereby the sufficient amount of fuel required by the fuel cells can be circulated through the fuel-circulating passage.

When the fuel pump and the ejector are utilized in combination as the fuel cell-forwarding device, even under conditions where the ejector fails to jet fuel as is the case of an abrupt acceleration/deceleration of the fuel cells and thus fuel is not circulated by the ejector, the fuel cell controller may increase the rotation speed of the fuel pump so that the sufficient amount of fuel required by the fuel cells can be circulated through the fuel-circulating passage.

The above fuel-forwarding device may be provided with either a single ejector or a plurality of ejectors.

According to an exemplified second aspect of the present invention, the above fuel cell controller monitors a condition level of the fuel cell.

With the second aspect of the present invention, the fuel cell controller monitors a cell voltage, a dew point of fuel at an inlet of the fuel cells, and/or other condition levels of the fuel cells, and thus can exercise an adequately control on the circulation rate of the fuel with fine adjustment made to the condition level.

According to an exemplified third aspect of the present invention, the above fuel cell controller determines a target rotation speed of the fuel pump based upon the output instruction value transmitted to the fuel cell.

With the third aspect of the present invention, the fuel cell controller controls the fuel pump so that the fuel pump rotates at a target rotation speed based upon the output instruction value instead of the output of the fuel cells. The reason why the fuel cell controller does not utilize the varying output of the fuel cells to control the fuel pump is that the change of the output of the fuel cells always suffers a delay in responding to the output instruction. Accordingly, the circulation rate of the fuel is controlled based upon the output instruction value so that the control is not affected by the delay in response.

The above fuel cell controller may include a control map that indicates a relationship between the output instruction value and the target rotation speed (or fuel circulation rate) of the fuel cell. By looking up the control map, the fuel cell controller can promptly evaluate the fuel circulation rate required by the fuel cells and determine the target rotation speed of the fuel pump, so that the fuel cell controller can control the rotation speed of the fuel pump swiftly. Consequently, the fuel cell controller can quickly regulate the fuel to circulate in sufficient amount required by the fuel cells through the fuel-circulating passage upon an abrupt acceleration/deceleration.

According to an exemplified fourth aspect of the present invention, the fuel cell controller determines a target rotation speed of the fuel pump based upon the output instruction value transmitted to the fuel cell, and calculates a rotation correction coefficient based upon the condition level as in the third aspect of the present invention, and the fuel cell controller controls the fuel pump so that the fuel pump rotates at the target rotation speed corrected with the rotation correction coefficient. The above rotation correction coefficient may be calculated based upon the output instruction value together with the condition level.

While the target rotation speed of the fuel pump is determined based upon the output instruction value as in the third aspect of the present invention, the target rotation speed used in the fourth aspect of the present invention is corrected with a rotation correction coefficient calculated with consideration given to the conditions of the fuel cells (e.g., a cell voltage, a dew point, etc.), so that the rotation speed of the fuel pump is adjusted to the rotation speed instruction value.

For example, if the cell voltage falls below a predetermined range under the influence of generated water, condensed water, or the like, the rotation correction coefficient may be set larger, to accelerate the rotation of the fuel pump, increasing the circulation rate of the fuel. The increased circulation rate of the fuel serves to remove condensed water or the like in the cells, and to restore the cell voltage to a value within the predetermined range, allowing the circulation rate of the fuel to converge on the fuel circulation rate (corresponding to the target rotation speed) indicated by the output instruction value.

Moreover, the rotation correction coefficient may be calculated with consideration given to both of the condition level of the fuel cell and the output instruction value, and thus-calculated rotation correction coefficient permits finer adjustment of the fuel circulation rate, with which an adequate amount of fuel required by the fuel cells can be circulated through the fuel-circulating passage.

According to an exemplified fifth aspect of the present invention, the condition level includes a cell voltage of the fuel cell, and/or a dew point of the fuel at an inlet to the fuel cell.

With this aspect of the invention, an adjustment of the amount of fuel circulated through the fuel-circulating passage can be made with the condition of the fuel cells given from the condition level.

According to an exemplified sixth aspect of the present invention, the above fuel cell controller determines a target rotation speed of the fuel pump based upon the output instruction value, obtains an output increase/decrease rate as a rate of change of the output instruction value with respect to time, calculates a rotation correction coefficient based upon the output increase/decrease rate (or the output increase/decrease rate and the output instruction value), and controls the fuel pump so that the fuel pump rotates at a rotation speed obtained by correcting the target rotation speed with the rotation correction coefficient.

While the target rotation speed of the fuel pump may determined with consideration given to the output instruction as in the third aspect of the present invention, the fuel cell controller of the sixth aspect of the present invention characteristically calculates the rotation correction coefficient in accordance with the rate of change of the output of the fuel cells (output instruction value) with respect to time.

When the rate of change of the output of the fuel cells with respect to time is large, the output of the fuel cells varies greatly in a short time; thus, the rotation correction coefficient is set to a large value. Contrariwise, when the rate of change of the output of the fuel cells with respect to time is small, the rotation correction coefficient is set to a small value.

The rotation correction coefficient may be calculated with consideration given to both of the rate of change of the output of the fuel cells with respect to time and the output instruction value, whereby a finer adjustment can be made to the circulation rate of the fuel.

The above-described operations of calculating a rotation correction coefficient, calculating a rotation speed instruction value by correcting the target rotation speed with the rotation correction coefficient, and controlling the fuel pump so that the fuel pump rotates at a rotation speed corresponding to the rotation speed instruction value allows an adequate amount of fuel required by the fuel cells to circulate through the fuel-circulating passage upon acceleration/deceleration of the fuel cells.

According to an exemplified seventh aspect of the present invention, the above fuel cell controller calculates an operation time of the fuel pump based upon the output instruction value and the output increase/decrease rate, and controls the fuel pump so that the fuel pump rotates during the operation time.

With the seventh aspect of the present invention, the fuel cell controller determines an operation time for which the fuel pump performs an accelerated rotation based upon the output increase/decrease rate, and thereby controls the fuel pump. Thus-configured control sets the operation time to a large value when the output increase/decrease rate varies greatly, while setting the operation time to a small value when the output increase/decrease rate varies slightly, and can thus circulate an adequate amount of fuel required by the fuel cells upon an abrupt acceleration/deceleration of the fuel cells.

Hereupon, the "accelerated rotation" is a rotation when the rotation correction coefficient calculated as in the sixth aspect of the present invention is greater than one, and when the rotation speed instruction value transmitted to the fuel pump is greater than the target rotation speed.

According to an exemplified eighth aspect of the present invention, the above fuel-circulating passage includes a bypass that detours round the fuel pump, and a bypass valve that is operated by the fuel cell controller to open and close based upon the condition level, and the bypass valve is opened when the condition level falls within a predetermined range, while the bypass valve is closed when the condition level is out of the predetermined range, so that the fuel pump is rotated at a rotation speed according to the condition level.

With the eighth aspect of the present invention, there is provided a bypass that detours round the fuel pump, and in the bypass is provided a bypass valve that is operated to open and close under control of the fuel cell controller.

This arrangement permits the fuel pump to operate only when necessitated. To be more specific, when the fuel cells are under a normal operating condition, the fuel pump is stopped, and the fuel is circulated through the bypass, so that only the ejector is used to circulate the fuel. Further, only either when an abrupt acceleration deceleration instruction is transmitted to the fuel cells or when the condition level of the fuel cells is out of the predetermined range, the fuel pump is rotated; thereby electric power for operating the fuel pump can be saved.

According to an exemplified ninth aspect of the present invention, the above fuel cell controller stops the fuel pump or lets the fuel pump idle when the condition level falls within the predetermined range.

With the ninth aspect of the present invention, in a hybrid system that uses both of the ejector and the fuel pump in combination as a fuel-forwarding device, the fuel pump is stopped or let idle when the condition level (e.g., a cell voltage, a dew point, or the like) of the fuel cell is within the predetermined range, so that electric power consumed in the fuel pump may be restricted. Consequently, the energy efficiency of the overall system can be enhanced.

Other objects and further features of the present invention will become readily apparent from the following description of preferred embodiments with reference to accompanying drawings.

DETAILED DESCRIPTION OF THE PREFERRED EMBODIMENTS

A description will hereinafter be given of preferred embodiments of the present invention with reference to the drawings, though it is to be understood that the scope of the present invention is not limited to the following embodiments but various changes and modifications may be made without departing from the spirit of the invention.

First Embodiment

Figure 1:
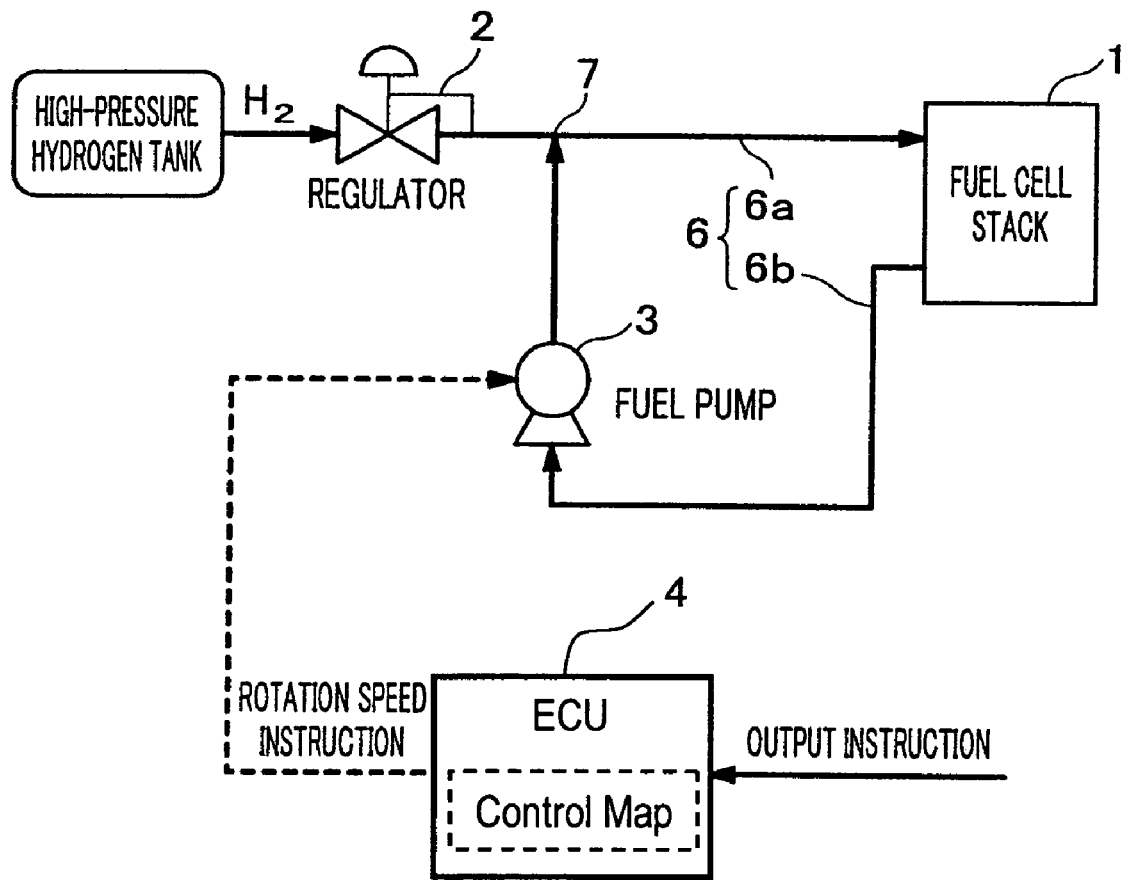
FIG. 1 is a schematic block diagram illustrating a device configuration of a first embodiment of a fuel-circulating fuel cell system according to the present invention.

FIG. 1 illustrates a first embodiment of a fuel-circulating fuel cell system according to the present invention. The first embodiment adopts the fuel pump-using approach as a circulation system, and corresponds to the first aspect of the present invention. This embodiment exemplifies one of the most basic arrangements according to the present invention.

Referring to FIG. 1, hydrogen as a fuel to be supplied from a high-pressure hydrogen tank or the like to a fuel cell stack 1 undergoes pressure regulation in advance by a regulator 2. The hydrogen supplied from the regulator 2 is mixed at a junction 7 with hydrogen discharged from the fuel cell stack 1, and is supplied through a fuel-circulating passage 6a to an anode of the fuel cell stack 1.

Hydrogen unused at the anode is discharged, together with condensed water in the fuel cell stack 1, through the fuel-circulating passage 6b, gains circulating momentum by means of a fuel pump 3 disposed at a point along the fuel-circulating passage 6b, and comes to the junction 7 again. The hydrogen having arrived at the junction 7 joins with hydrogen supplied from the regulator 2, and is supplied to the fuel cell stack 1 again.

It is understood, though not shown in the drawings, that air as an oxidizing agent is introduced at a cathode of the fuel cell stack 1. The same applies to the second through sixth embodiments that will be described later.

In the first embodiment of the fuel-circulating fuel cell system as described above, when an acceleration/deceleration value is input to an electronic control unit (ECU) 4 as a fuel cell control device, the ECU 4 creates an output instruction value used to control the output of the fuel cell stack 1 according to the acceleration/deceleration value. The acceleration/deceleration value, for example, corresponds to the amount of depression of the accelerator pedal of the fuel-cell vehicle. The ECU 4 then looks up a prestored control map (as shown in FIG. 2B) showing a relationship between an output instruction value and a target rotation speed (hereinafter referred to as "output versus rotation speed map") to determine a target rotation speed for the output instruction value of the fuel pump 3. The ECU 4 thus controls the fuel pump 3 so that the fuel pump 3 rotates at the target rotation speed, to secure a circulation rate of the fuel required by the fuel-circulating fuel cell system.

FIG. 2B is a graph of which the ordinates denote rotation speeds (fuel circulation rates) of the fuel pump 3 and the abscissas denote output instruction values; the fuel circulation rates required by the fuel cells (rotation speeds of the fuel pump 3) are uniquely determined by the output instruction values.

With the first embodiment of the fuel-circulating fuel cell system, even if an abrupt acceleration/deceleration instruction is transmitted, the ECU 4 evaluates a fuel circulation rate required by the fuel cell stack 4 immediately based upon a corresponding output instruction value by looking up the output versus rotation speed map (see FIG. 2B), and controls the fuel pump 3 so that the fuel pump 3 rotates at a target rotation speed obtained from the map. Accordingly, the amount of fuel required by the fuel cells can be circulated through the fuel-circulating passage 6.

Next, a specific control flow of the first embodiment will be described with reference to the flowchart shown in FIG. 2A.

When the ECU 4 receives an output instruction (S11), the ECU 4 locates a target rotation speed of the fuel pump 3 corresponding to an output instruction value for the output instruction (S12) by looking up the prestored output versus rotation speed map (as in FIG. 2B) (S13).

Subsequently, the ECU 4 controls the fuel pump 3 so that the fuel pump 3 rotates at the target rotation speed (S14), and the process terminates (S15).

Although the fuel pump 3 and the regulator 2 exemplify a fuel-forwarding device used to circulate fuel in the first embodiment as described above, any known means for circulating fuel may be used instead. The ECU 4, which serves as a fuel cell controller in this embodiment, may be substituted by any arrangement, dedicated or combined, available.

Second Embodiment

Figure 3:
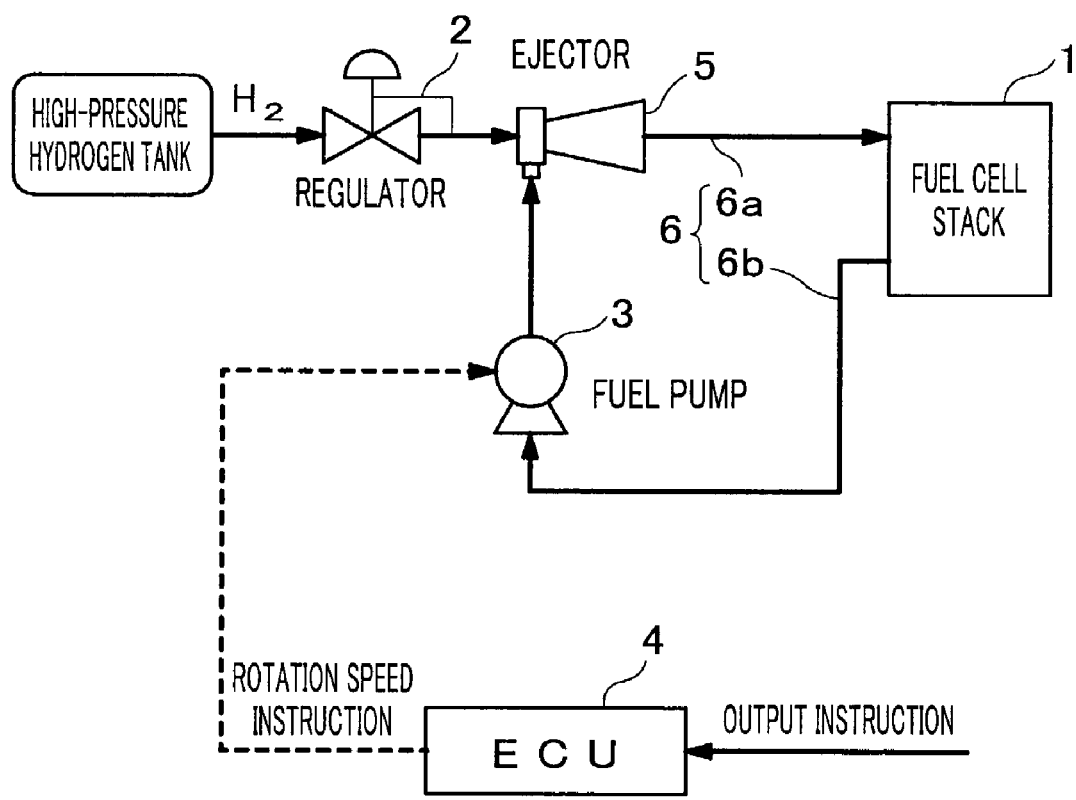
FIG. 3 is a schematic block diagram illustrating a device configuration of a second embodiment of the fuel-circulating fuel cell system according to the present invention.

FIG. 3 illustrates a device configuration of a second embodiment of the fuel-circulating fuel cell system according to the present invention. The second embodiment adopts a combined use of a fuel pump and an ejector as a circulation system, and corresponds to the first and third aspects of the present invention. This embodiment exemplifies one of the most basic arrangements of a hybrid system provided with both of the fuel pump and the ejector as a fuel-forwarding device in a fuel-circulating passage.

In the second embodiment of the fuel-circulating fuel cell system, in a fuel-circulating passage 6a is provided an ejector 5, of which a nozzle 5a that will be described later is connected with a high-pressure hydrogen tank via a regulator 2, so that new fuel may be supplied to a fuel cell stack 1 utilizing the pressure of the high-pressure hydrogen tank. In addition, a fuel pump 3, which is provided in a fuel-circulating passage 6b, can give circulating momentum of the fuel independently of the ejector 5. The fuel-circulating passage 6b is connected with a suction chamber 5c (FIG. 4) that will be described later of the ejector 5, so that fuel can be circulated through the fuel-circulating passage 6 with the ejector alone when the ejector 5 jets new fuel from the nozzle 5a (FIG. 4), though the quantity of the fuel might be limited.

Figure 4:
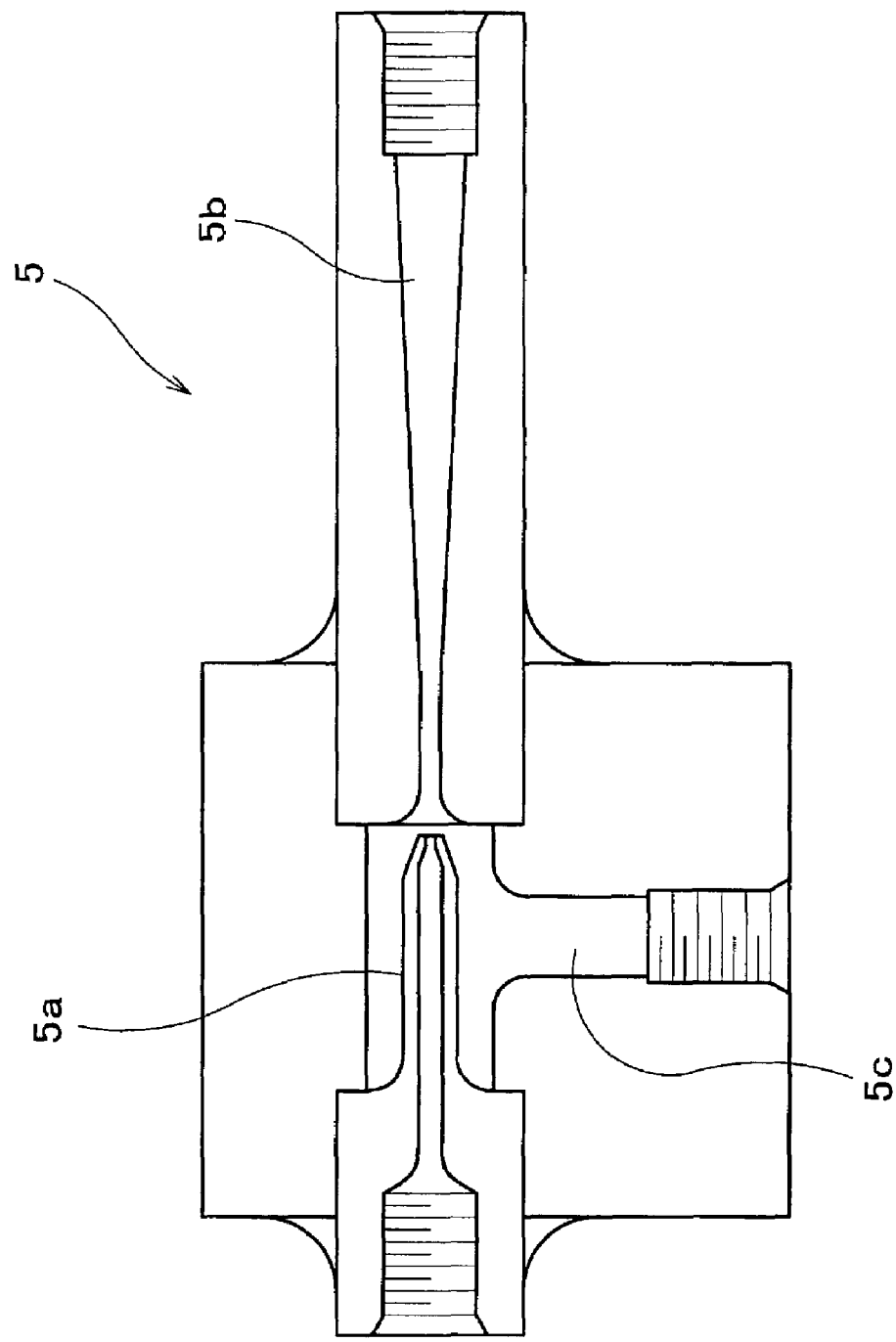
FIG. 4 is a cross section of an ejector.

Here, a description will be given of the ejector 5 with reference to FIG. 4. The ejector 5 is a kind of vacuum pump, and is capable of converting energy in the form of pressure into energy for transporting a matter. The ejector 5 is comprised of a nozzle 5a, a diffuser 5b, and a suction chamber 5c. The suction chamber 5c is connected with the fuel-circulating passage 6b.

Hydrogen that has come out of the high-pressure hydrogen tank or the like and has undergone pressure regulation while passing through the regulator 2 is jetted from the thinly narrowed nozzle 5a of the ejector 5 at high speeds. The hydrogen jetted from the nozzle 5a is supplied from the fuel-circulating passage 6b to the suction chamber 5c, and moves to the diffuser 5b while involving hydrogen unused in the fuel cell stack 1. Accordingly, by jetting new hydrogen from the nozzle 5a, hydrogen is driven to circulate in the fuel-circulating passage 6.

As discussed above, characteristically in the second embodiment, the ejector 5 and the fuel pump 3 are both used in combination as a fuel-forwarding device for circulating hydrogen in the fuel-circulating passage 6.

Figure 20:
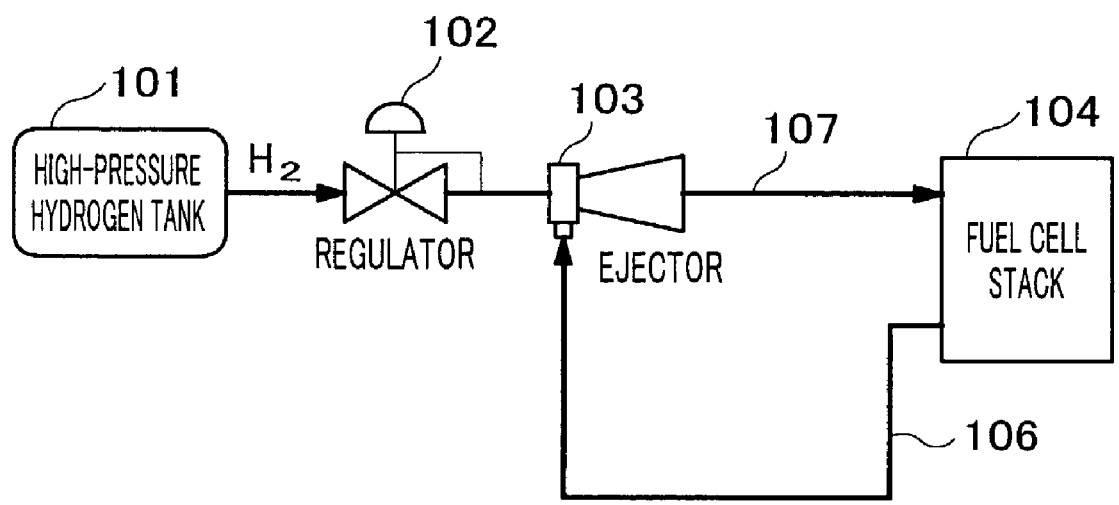
FIG. 20 is a schematic block diagram illustrating a device configuration of a conventional fuel-circulating fuel cell system.
Figure 21A:
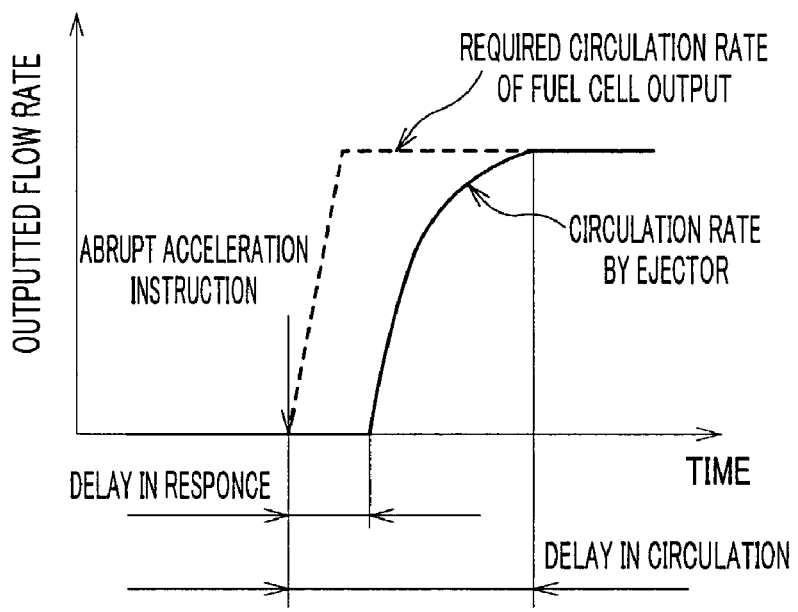
FIGS. 21A and 21B are graphs for describing disadvantages in the conventional fuel-circulating fuel cell system.
Figure 21B:
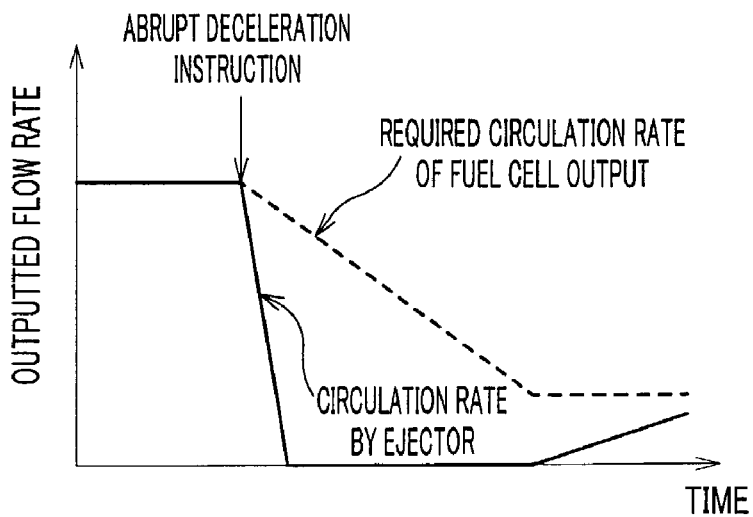

With the conventional system as shown in FIG. 20 that circulates fuel only using a ejector 5, when an abrupt acceleration/deceleration instruction is transmitted, disadvantageous conditions would be brought on such as delayed response to hydrogen supply (upon abrupt acceleration; see FIG. 21A), and suspension of hydrogen circulation (upon abrupt deceleration; see FIG. 21B).

In contrast, with the second embodiment of the fuel-circulating fuel cell system, the fuel pump 3 under the control of the ECU 4 is provided in addition to the ejector 5 so as to circulate hydrogen; thus, even when an abrupt acceleration/deceleration instruction is transmitted in a manner that cannot appropriately be responded by the ejector 5, the ECU 4 regulates the rotation speed of the fuel pump 3 by looking up the output versus rotation speed map (as in FIG. 2B) so that the fuel pump 3 rotates at a target rotation speed. Consequently, the circulation rate of fuel required by the fuel-circulating fuel cell system can be secured appropriately.

Figure 2A:
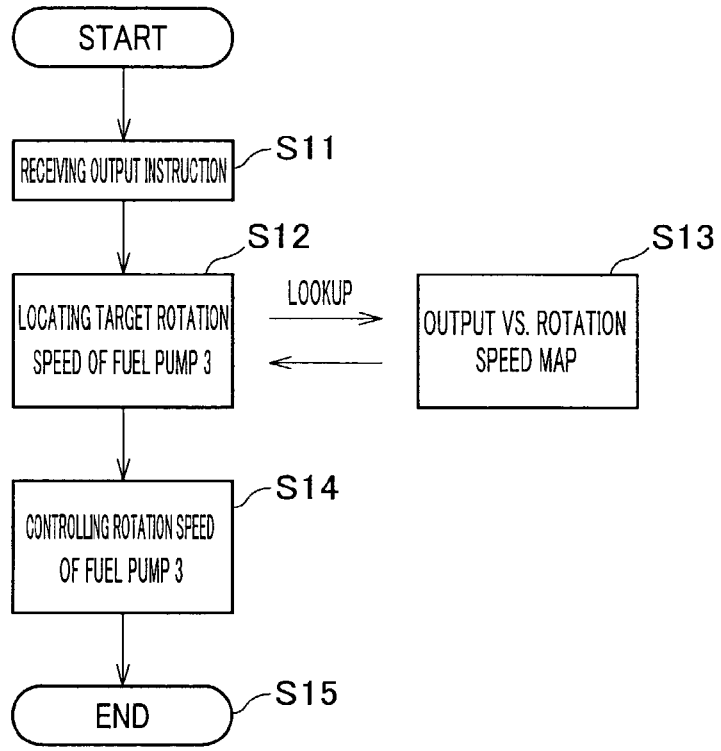
FIG. 2A is a control flowchart of the first embodiment of the present invention.
Figure 2B:
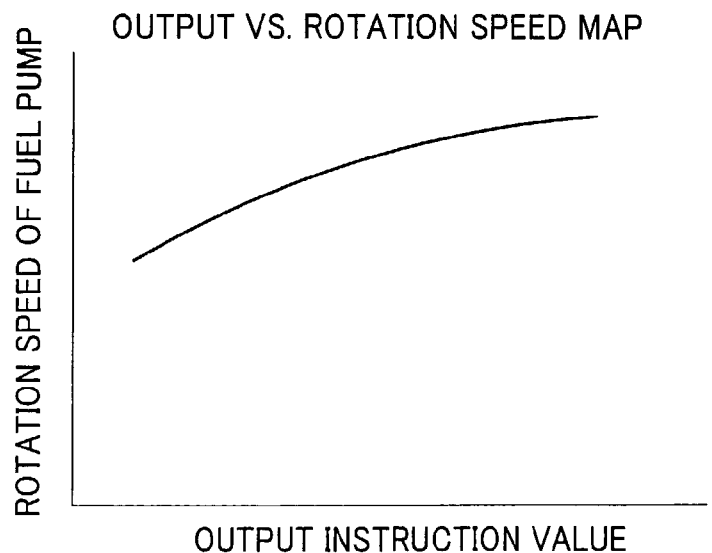
FIG. 2B is a graph showing an output versus rotation speed map.

Since the control flow of the second embodiment is substantially the same as that of the first embodiment (as shown in FIG. 2A), a duplicate explanation thereof will be omitted herein.

It is understood that the use of the ECU 4 as a fuel cell controller in this embodiment is exemplary only, and any known arrangement may be applied.

Third Embodiment

Figure 5:
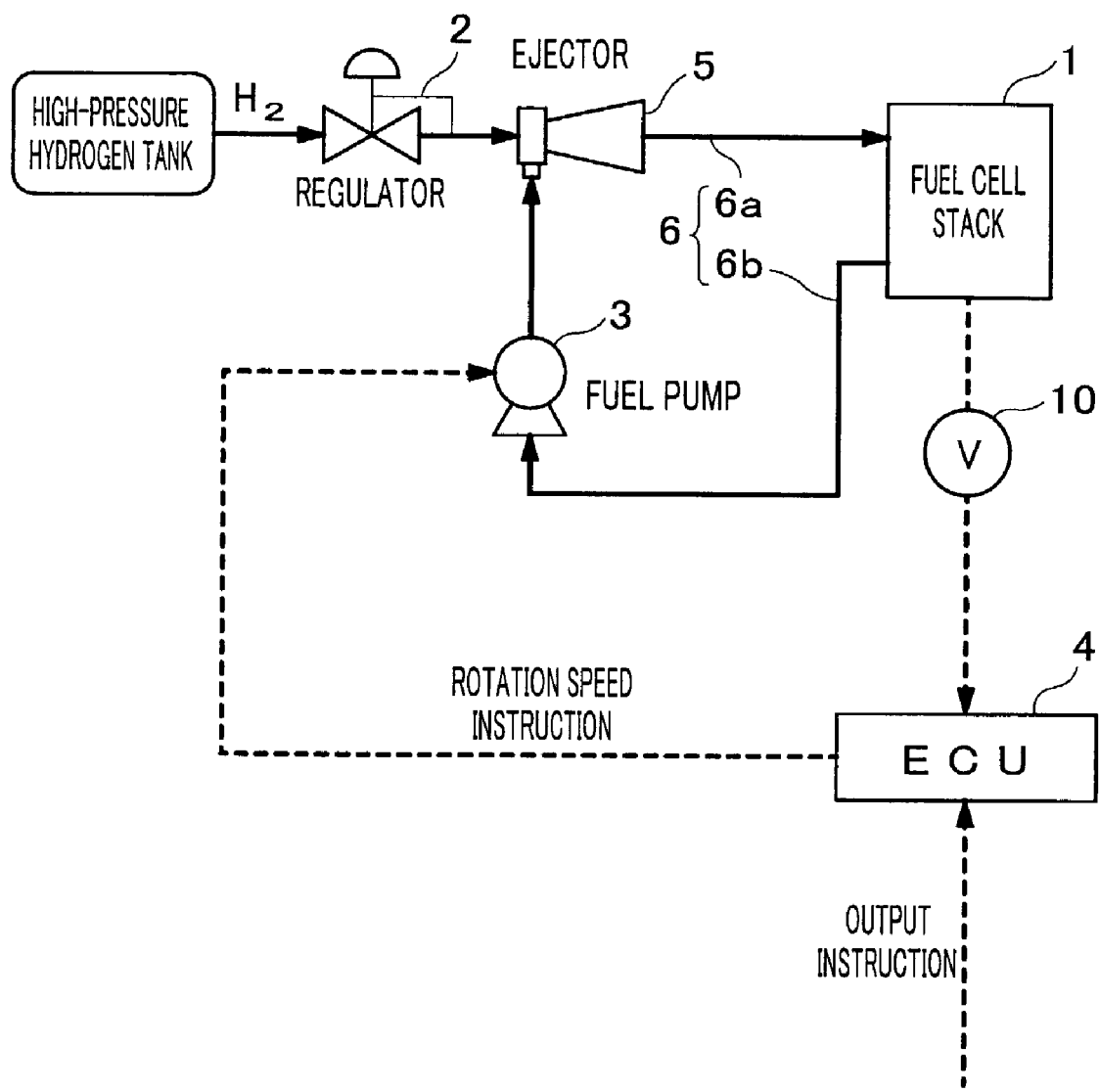
FIG. 5 is a schematic block diagram illustrating a device configuration of a third embodiment of the fuel-circulating fuel cell system according to the present invention.

FIG. 5 illustrates a third embodiment of the fuel-circulating fuel cell system according to the present invention. The third embodiment adopts a circulation system that uses a fuel pump 3 and an ejector 5 in combination as a fuel-forwarding device, and corresponds to the second, third, fourth, and fifth aspects of the present invention.

The device configuration of the third embodiment is identical with that of the second embodiment (see FIG. 3), except that the ECU 4 monitors a cell voltage of the fuel cells using a voltmeter 10.

The fuel cells are designed to operate when the cell voltage falls within a predetermined range. However, the cell voltage is susceptible to accumulation of generated water and condensed water in the fuel cell stack 1, and would thus decrease below the predetermined range. This embodiment exemplifies fuel-circulating fuel cell systems that, even when an output instruction is transmitted to the fuel cells under the above circumstances, can swiftly generate the output required by the output instruction while restoring the cell voltage, and can constantly fulfill the hydrogen circulation rate required by the fuel cells.

Figure 6:
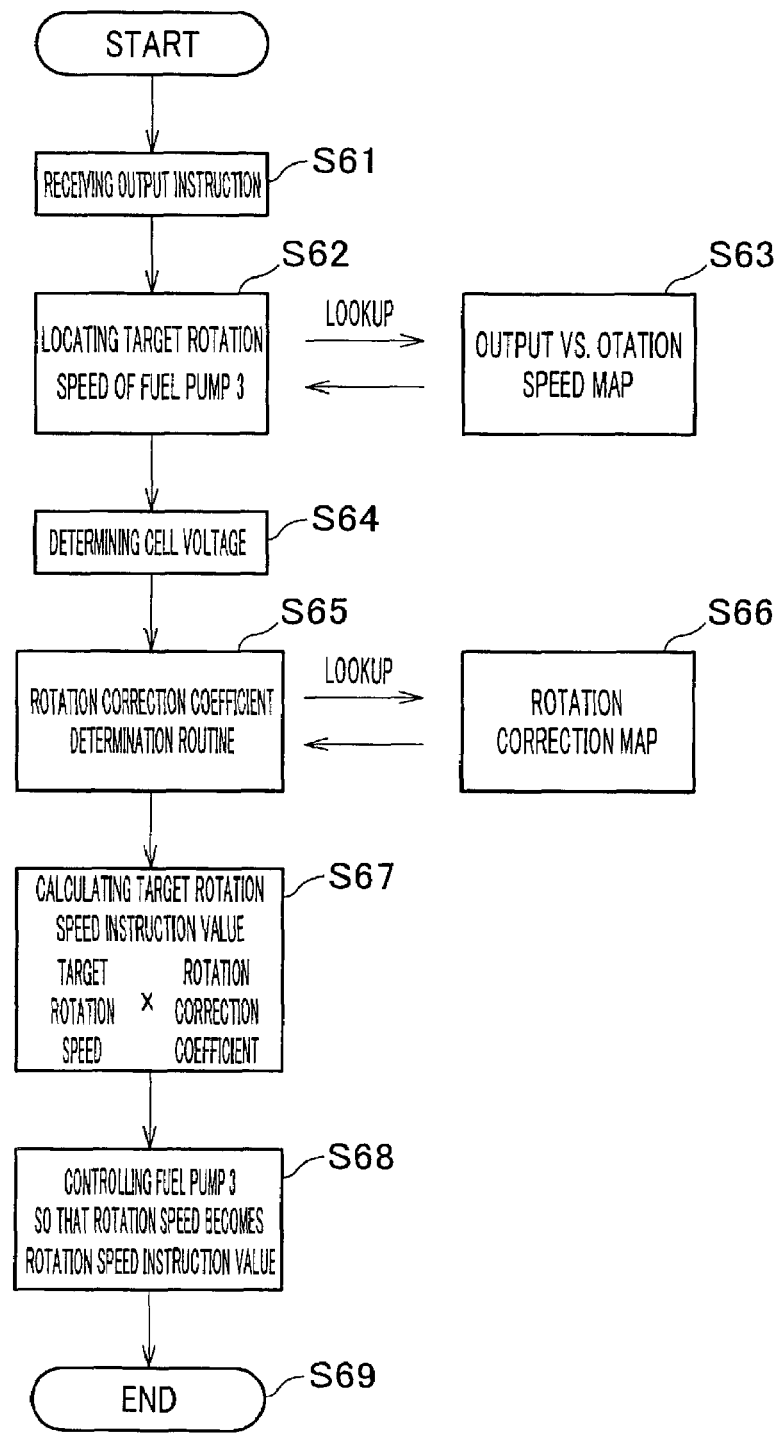
FIG. 6 is a control flowchart of the third embodiment of the present invention.

A description will now be given of a control flow of the third embodiment with reference to the flowchart shown in FIG. 6. When an acceleration/deceleration value as an output instruction is inputted to the ECU 4, the ECU 4 transmits an output instruction value corresponding to the acceleration/deceleration value to the fuel cell stack 1 (S61). At that stage, the ECU 4 locates a target rotation speed of the fuel pump 3 corresponding to the output instruction value (S62) by looking up the output versus rotation speed map (as shown in FIG. 2B) (S63). Subsequently, the ECU 4 determines a cell voltage of the fuel cells with the voltmeter 10 provided in the fuel cell stack 1 in order to check the condition of the fuel cell stack 1.

The ECU 4 uses the cell voltage alone or the cell voltage and the output instruction value as input values to calculate a rotation correction coefficient through a rotation correction coefficient determination routine (S65). At this stage, the rotation correction coefficient determination routine looks up a rotation correction map prepared in advance in the ECU 4 (S66). There are many variations of approaches to rotation correction coefficient determination utilizing the rotation correction coefficient determination routine and the rotation correction map, and a detailed description will be given later.

Next, a rotation speed instruction value of the fuel pump 3 is calculated by finding the product of the target rotation speed obtained in step S62 and the rotation correction coefficient obtained in step S65 (S67).

Next, the ECU 4 controls the fuel pump 3 so that the rotation speed of the fuel pump 3 becomes the rotation speed instruction value (S68), and the process terminates (S69).

In this control flow, a process step for detecting the rotation speed of the fuel pump 3 and determining whether the speed have reached the rotation speed instruction value may be provided after step S68 to perform a feedback control, in which if it is determined that the rotation speed of the fuel pump 3 has not reached the rotation speed instruction value, then the process goes back to step S64.

The addition of such a feedback control process to the control flow makes it possible to constantly update the rotation correction coefficient in accordance with varying cell voltages, and to reflect the cell voltage more accurately on the control of the rotation speed of the fuel pump 3.

Hereupon, the rotation correction coefficient is a coefficient that determines an increase in rotation speed of the fuel pump 3 required to restore the cell voltage within the predetermined range if the cell voltage falls below the predetermined range. If the cell voltage falls within the predetermined range, the rotation correction coefficient becomes 1, and as the cell voltage becomes lower below the predetermined range, the rotation correction coefficient becomes larger.

Next, a description will be given of variations of approaches to rotation correction coefficient determination utilizing the rotation correction coefficient determination routine (S65) and the rotation correction map (S66).

(1) First Approach

In the first approach, the rotation correction coefficient determination routine (S65) determines the rotation correction coefficient using a cell voltage as a single input value. At this stage, the rotation correction coefficient determination routine (S65) looks up a rotation correction map shown in FIG. 7A.

Figure 7A:
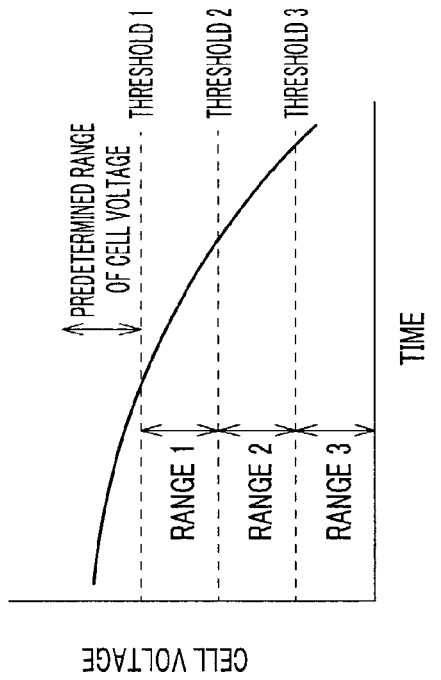
FIG. 7A shows a rotation correction map used in a first approach of a rotation correction coefficient determination routine according to the third embodiment of the present invention.

FIG. 7A is a graph of which the ordinates denote rotation correction coefficients and the abscissas denote cell voltages. As shown in FIG. 7A, a correction coefficient straight line indicating a relationship of rotation correction coefficients to cell voltages declines from the left to the right. A point of intersection of the correction coefficient straight line and the axis of abscissas denotes a predetermined value of the cell voltage, and the fuel cells are normally designed to operate under the condition where the cell voltage approximates to the predetermined value (within a predetermined range of values).

The cell voltage determined in step S64 is applied to the rotation correction map shown in FIG. 7A so that the rotation correction coefficient can be obtained. For example, when the cell voltage evaluated in step S64 is a, it immediately turns out from the map that the rotation correction coefficient is Ka.

(2) Second Approach

In the second approach, the rotation correction coefficient determination routine (S65) determines the rotation correction coefficient using a cell voltage and an output instruction value as input values. At this stage, the rotation correction coefficient determination routine (S65) looks up a rotation correction map shown in FIG. 7B.

The feature of the second approach is to utilize the output instruction value inputted in step S61 together with the cell voltage when obtaining the rotation correction coefficient.

Through the first approach, the rotation correction coefficient may be uniquely determined by the cell voltage, irrespective of the level of the output instruction value. The use of the first approach makes it possible to change the output of the fuel cells to the output instruction value while restoring the cell voltage of the fuel cells. Through the second approach, the rotation correction coefficient is determined with consideration given to the level of the output instruction value in addition to the cell voltage, and thus the time it takes for the output of the fuel cells to become the output instruction value can be shortened. More specifically, if the output required by the fuel cells (output instruction value) is large (when the fuel pump 3 rotates at high speeds), the rotation correction coefficient is made larger, and if the output required by the fuel cells (output instruction value) is small (when the fuel pump 3 rotates at low speeds), the rotation correction coefficient is made smaller, so that an adequate control fit to the conditions of the fuel cells can be performed.

Figure 7B:
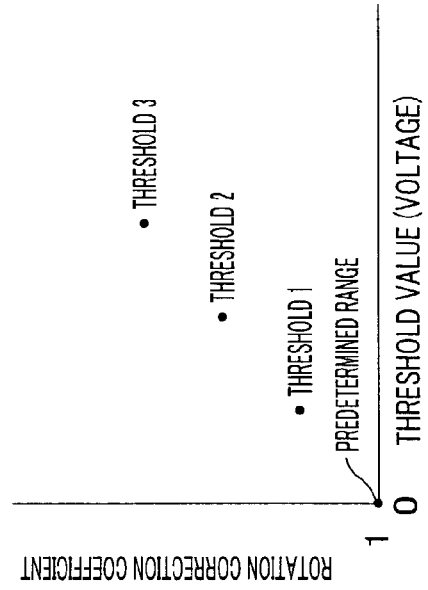
FIG. 7B shows a rotation correction map used in a second approach of the rotation correction coefficient determination routine according to the third embodiment of the present invention.

FIG. 7B is a graph showing correction coefficient straight lines corresponding to each output instruction value. Among a great number of actual data, exemplified three lines having the output instruction values A, B, and C are depicted in FIG. 7B. All the correction coefficient straight lines, of which those having larger output instruction values have steeper slopes, intersect at one point of the predetermined value on the axis of abscissas. The output instruction values C, B, and A are predetermined to be used respectively when the output of the fuel cell stack 1 falls within a largest-larger range, a larger-medium range, and a medium-smaller range.

In the second approach, the ECU 4 selects one line corresponding to the output instruction value among the correction coefficient straight lines, and then determines a rotation correction coefficient corresponding to the present cell voltage on the selected correction coefficient straight line, thereby controlling the fuel pump 3.

(3) Third Approach

In the third approach, the rotation correction coefficient determination routine (S65) determines the rotation correction coefficient using a cell voltage as a single input value. At this stage, the rotation correction coefficient determination routine (S65) looks up a rotation correction map shown in FIG. 7D.

Figure 7C:
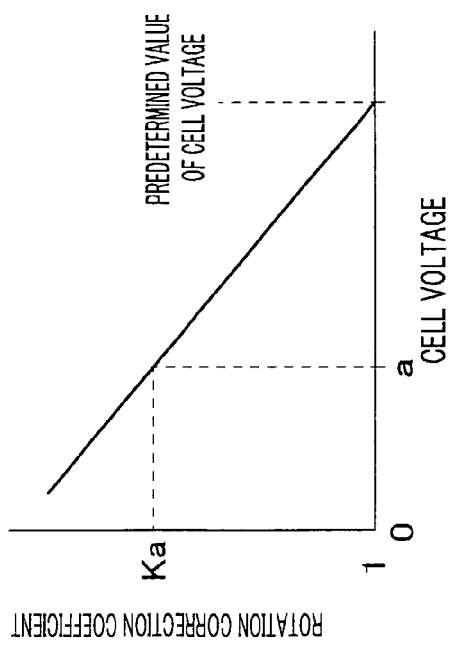
FIG. 7C shows a time-varying cell voltage when hydrogen is not supplied into the fuel cell stack.

The feature of the third approach is to evaluate a degree of drop in the cell voltage in a not continuous but stepwise manner, as will be described below with reference to FIG. 7C. FIG. 7C is a graph representing a time-varying cell voltage when hydrogen is not circulated in the fuel cell stack 1. As illustrated, if hydrogen is not circulated, the cell voltage gradually falls. In the third approach, the degree of drop in the cell voltage is regulated using threshold values. For example, as in FIG. 7C, the degree of drop in the cell voltage within the range 1 is represented by the threshold 1; within the range 2 by the threshold 2; and within the range 3 by the threshold 3.

Figure 7D:
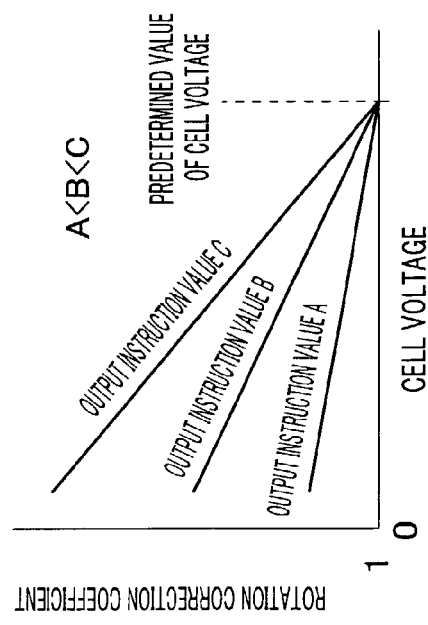
FIG. 7D shows a rotation correction map used in a third approach of the rotation correction coefficient determination routine according to the third embodiment of the present invention.

The ECU 4 determines which threshold the cell voltage obtained in step S64 corresponds to (i.e., within which range it falls), looks up the rotation correction map shown in FIG. 7D, and determines the rotation correction coefficient. As is evident from FIG. 7D, as the degree of drop in the cell voltage increases, the rotation correction coefficient becomes larger. If the cell voltage falls within the predetermined range (where the cell voltage exceeds the threshold 1 of FIG. 7C), the rotation of the fuel pump 3 need not be corrected; therefore, the rotation correction coefficient=1 is selected (as indicated by the intersecting point of the axis of ordinates and the axis of abscissas).

In the third approach, the cell voltages are represented by a number of threshold values, and thus the ECU 4 is not required to store any detailed rotation correction map in which the rotation correction coefficient is uniquely determined by the cell voltages, as shown in FIGS. 7A and 7B. Consequently, the amount of data the ECU 4 must store can be reduced.

Although the degree of drop in the cell voltage is evaluated with three threshold values for the purpose of illustration in the above description, the number of the threshold values is not restricted to three.

(4) Fourth Approach

In the fourth approach, the degree of drop in the cell voltage is evaluated with threshold values as in the third approach, and additionally the output instruction value is used to determine the rotation correction coefficient of the fuel pump 3 as in the second approach. At this stage, the rotation correction coefficient determination routine (S65) looks up a rotation correction map shown in FIG. 8A.

Figure 8A:
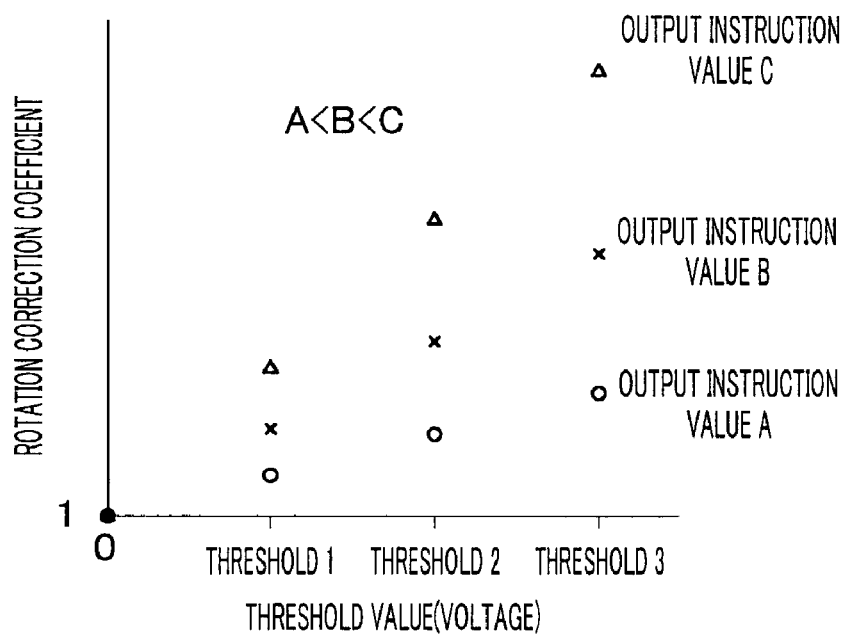
FIG. 8A shows a rotation correction map used in a fourth approach of the rotation correction coefficient determination routine according to the third embodiment of the present invention.

FIG. 8A is a graph of which the ordinates denote threshold values (of voltages) and the abscissas denote rotation correction coefficients. For each threshold value (threshold 1 through threshold 3), the rotation correction coefficient is uniquely determined by the output instruction value (A through C).

The output instruction values A through C as shown in FIG. 8A are depicted as representative values for the purpose of explanation, and in an actual system, the output instruction values may be set in further subdivided steps.

As described above, the degree of drop in the cell voltage is evaluated with a number of threshold values, and thereby the amount of data the ECU 4 must store can be reduced. Moreover, since the fourth approach additionally uses the output instruction value to determine the rotation correction coefficient as in the second approach, the time it takes for the output of the fuel cells to become the output instruction value can be shortened.

Although the above description refers to three threshold values used to evaluate the degree of drop in the cell voltage for the purpose of illustration, it is understood that the number of threshold values are not restricted to three.

(5) Fifth Approach

The fifth approach evaluates the degree of drop in the cell voltage using threshold values as in the third approach. Difference between the fifth approach and the third approach is seen in the rotation correction map to be looked up to obtain rotation correction coefficients.

Figure 8B:
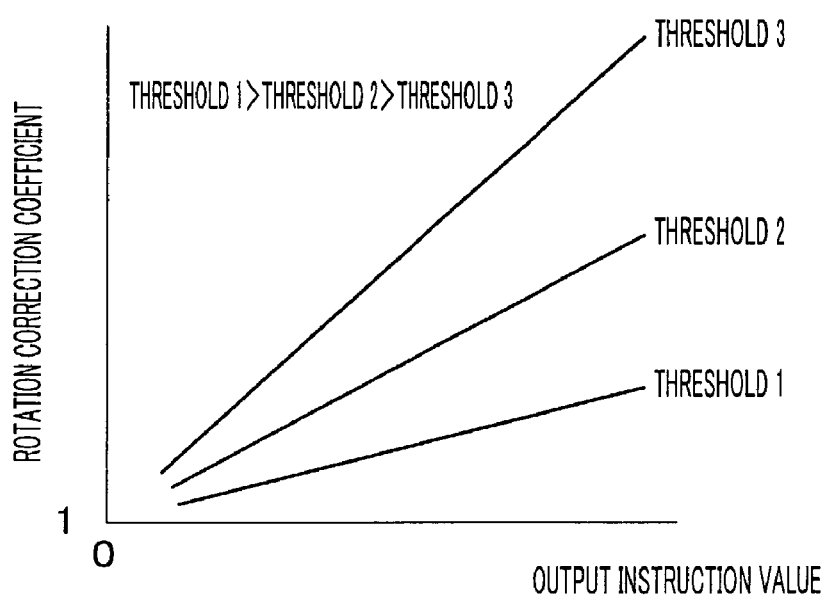
FIG. 8B shows a rotation correction map used in a fifth approach of the rotation correction coefficient determination routine according to the third embodiment of the present invention.

In the fifth approach, the rotation correction map as shown in FIG. 8B is used. FIG. 8B is a graph of which the ordinates denote rotation correction coefficients and the abscissas denote output instruction values transmitted to the fuel-circulating fuel cell system. In the graph, there are shown three correction coefficient straight lines corresponding to the threshold values (threshold 1 through threshold 3) shown in FIG. 7C.

The ECU 4 determines from the cell voltage obtained in step S64 which threshold value the cell voltage corresponds to, and selects one of the line to be used to obtain the rotation correction coefficient among the correction coefficient straight lines. Further, the ECU 4 locates and reads out a rotation correction coefficient corresponding to the output instruction value inputted in step S61 on the selected correction coefficient straight line.

If the cell voltage selected in step S64 falls within a predetermined value, the rotation correction coefficient=1 is selected.

Although the above description refers to three threshold values used to evaluate the degree of drop in the cell voltage for the purpose of illustration, it is understood that the number of threshold values are not restricted to three.

Fourth Embodiment

The device configuration of the fourth embodiment of the fuel-circulating fuel cell system is identical with that of the second embodiment (as shown in FIG. 3), and thus a duplicate illustration of the device configuration in the drawing is omitted. The fourth embodiment characteristically uses the output versus rotation speed map (as in FIG. 2B) to determine the target rotation speed of the fuel pump 3, and uses a rate of change of the output instruction values with respect to time counted with a timer equipped in the ECU 4 so that the ECU 4 controls the rotation speed of the fuel pump 3. The fourth embodiment corresponds to the sixth aspect of the present invention.

A description will now be given of a control flow of the fourth embodiment with reference to the flowchart shown in FIG. 9.

When an acceleration/deceleration value is inputted to the ECU 4, the ECU 4 transmits an output instruction value corresponding to the acceleration/deceleration value to the fuel cell stack 1 (S91). At that stage, the ECU 4 locates a target rotation speed of the fuel pump 3 (S92) by looking up the output versus rotation speed map (as shown in FIG. 2B) (S93). Subsequently, the ECU 4 calculates an output increase/decrease rate (dI/dt) as a rate of change of the output instruction value with respect to time (S94).

The ECU 4 calculates the rotation correction coefficient using as input an output increase/decrease rate alone or combination of the output increase/decrease rate and the output instruction value through the rotation correction coefficient determination routine (S95). At this stage, the rotation correction coefficient determination routine looks up a rotation correction map provided in the ECU 4 beforehand (S96). There exist various approaches for determination of the rotation correction coefficient using the rotation correction coefficient determination routine and the rotation correction map, and a detailed description will be given later.

Next, the product of the target rotation speed obtained in step S92 and the rotation correction coefficient obtained in step S95 is calculated to obtain a rotation speed instruction value given to the fuel pump 3 (S97).

Subsequently, the ECU 4 controls the fuel pump 3 so that the fuel pump 3 rotates at a speed equivalent to the rotation speed instruction value (S98), and the process terminates (S99).

The output increase/decrease rate (dI/dt) is a rate of change of the output instruction value given to the fuel-circulating fuel cell system with respect to time. Taking a fuel-cell vehicle as an example, the output increase/decrease rate (dI/dt) varies with the amount of depression of the accelerator pedal; that is, quick depression of the accelerator pedal makes the output increase/decrease rate (dI/dt) larger, while slow depression of the accelerator pedal makes the output increase/decrease rate (dI/dt) smaller.

Next, a description will be given of various approaches to determination of the rotation correction coefficient using the rotation correction coefficient determination routine (S95) and the rotation correction map (S96).

(1) First Approach

In the first approach, the rotation correction coefficient determination routine (S95) determines the rotation correction coefficient using an output increase/decrease rate (dI/dt) as a single input value. At this stage, the rotation correction coefficient determination routine (S95) looks up a rotation correction map shown in FIG. 10A.

Figure 10C:
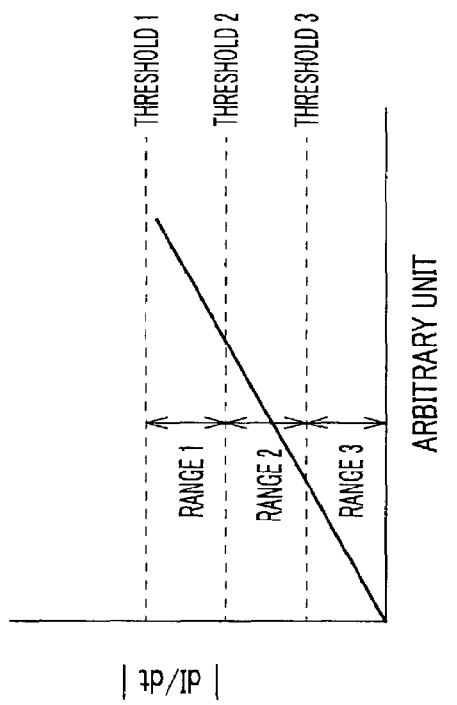
FIG. 10C is a graph for evaluating the absolute values of output increase/decrease rates.
Figure 10D:
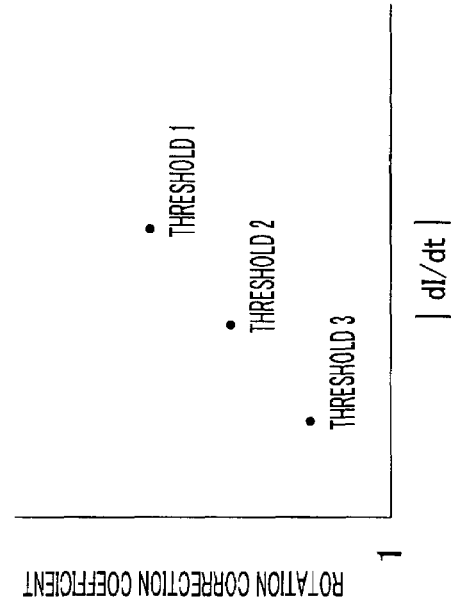
FIG. 10D shows a rotation correction map used in a third approach of the rotation correction coefficient determination routine according to the fourth embodiment of the present invention.
Figure 10A:
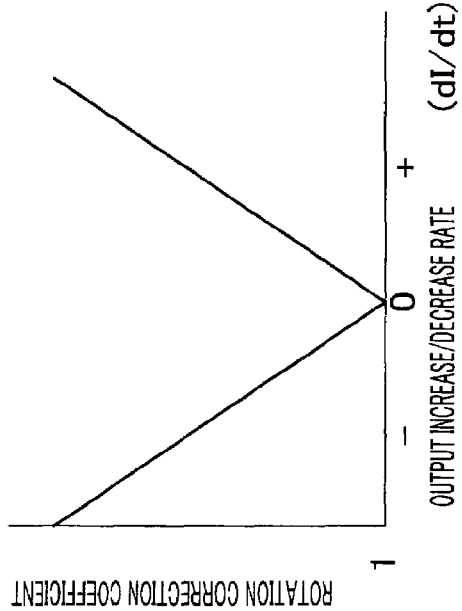
FIG. 10A shows a rotation correction map used in a first approach of a rotation correction coefficient determination routine according to the fourth embodiment of the present invention.

FIG. 10A is a graph of which the ordinates denote rotation correction coefficients and the abscissas denote output increase/decrease rates calculated in step S94. The rotation correction coefficient assumes 1, the minimum value, when the output increase/decrease rate (dI/dt) is 0, and the rotation correction coefficient assumes a larger value as the absolute value of the output increase/decrease rate (dI/dt) is made larger.

Irrespective of whether the output increase/decrease rate (dI/dt) is positive or negative, the rotation correction coefficient becomes larger, and this is because the amount of hydrogen circulating in the fuel-circulating passage 6 temporarily becomes insufficient under both conditions of acceleration and deceleration in the fuel cell system as shown in FIGS. 21A and 21B.

The larger absolute value of the output increase/decrease rate (dI/dt) signifies that the accelerator pedal is abruptly depressed, and implies that the output of the fuel cell should be regulated to increase to reach the output instruction value within a short time period. Accordingly, in order to raise the rotation speed of the fuel pump 3 to a predetermined value within a short time period, the rotation correction coefficient should be made larger.

In contrast, the smaller absolute value of the output increase/decrease rate (dI/dt) signifies that the accelerator pedal is slowly depressed, and implies that the rotation speed of the fuel pump 3 may be regulated moderately. Accordingly, the rotation correction coefficient may be made smaller.

(2) Second Approach

In the second approach, the rotation correction coefficient determination routine (S95) determines the rotation correction coefficient using the output increase/decrease rate (dI/dt) and the output instruction value as input values. At this stage, the rotation correction coefficient determination routine (S95) looks up a rotation correction map shown in FIG. 10B.

Figure 9:
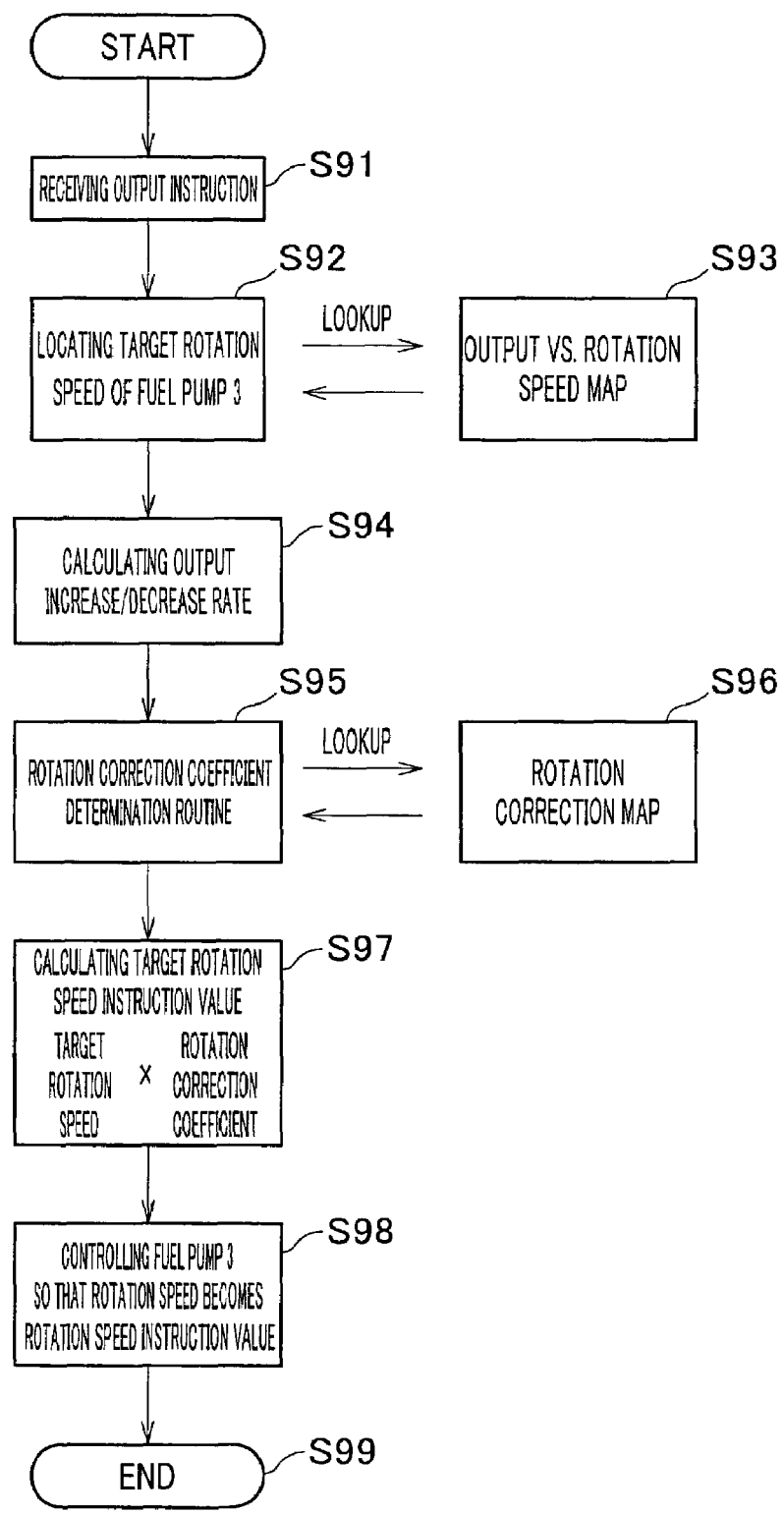
FIG. 9 is a control flowchart of a fourth embodiment of the present invention.
Figure 10B:
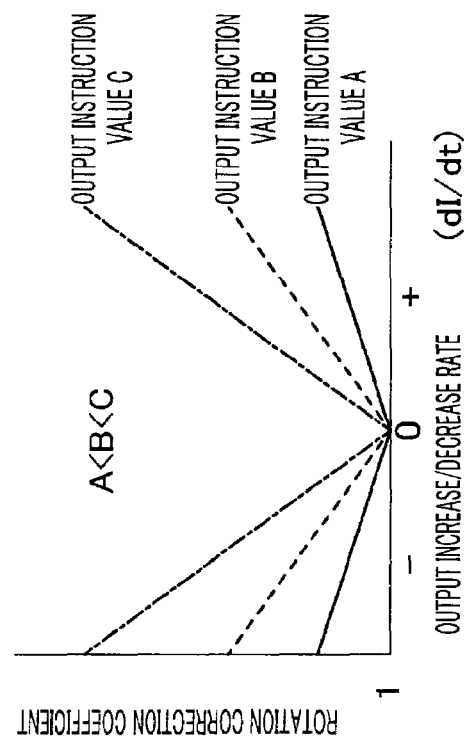
FIG. 10B shows a rotation correction map used in a second approach of the rotation correction coefficient determination routine according to the fourth embodiment of the present invention.

FIG. 10B is a graph of which the ordinates denote rotation correction coefficients and the abscissas denote output increase/decrease rates. In FIG. 10B, lines indicating correction coefficients for each output instruction value inputted in step S91 (see FIG. 9) are shown, and among a number of lines, exemplified three lines having the output instruction values A, B, and C are depicted. The concept of the output instruction values A, B, and C is identical to that shown in FIG. 7B, and thus a duplicate description will be omitted herein.

In the second approach, the ECU 4 selects one line corresponding to the output instruction value inputted in step S91 among the correction coefficient straight lines, and then determines a rotation correction coefficient corresponding to the present output increase/decrease rate on the selected correction coefficient straight line.

With the second approach, since the rotation correction coefficient is determined with consideration given to the output instruction value, the fuel pump 3 can be controlled so that the rotation speed thereof may swiftly become the rotation speed instruction value.

(3) Third Approach

In the third approach, the rotation correction coefficient determination routine (S95) determines the rotation correction coefficient using an output increase/decrease rate (dI/dt) as a single input value. At this stage, the rotation correction coefficient determination routine (S95) looks up a rotation correction map shown in FIG. 10D.

The feature of the third approach is to calculate the absolute value of the output increase/decrease rate and then evaluate the absolute value in a stepwise manner.

The rotation correction coefficient graphs of FIGS. 10A and 10B are substantially symmetrical with respect to a straight line representing the equation: output increase/decrease rate=0. This is because the amount of hydrogen circulating in the fuel-circulating passage 6 temporarily decrease in both conditions of acceleration and deceleration, which requires the rotation speed of the fuel pump 3 to increase. Like this, the rotation correction coefficient graphs are substantially symmetrical with respect to the straight line representing the equation: output increase/decrease rate=0; therefore, the rotation correction coefficient can be determined by calculating the absolute value of the output increase/decrease rate (hereinafter represented by |dI/dt|), and evaluating the absolute value in a stepwise manner.

The specific operation of the above process will be described below with reference to FIG. 10C. FIG. 10C is a graph of which the ordinates denote |dI/dt|. The third approach evaluates |dI/dt| using threshold values. For example, as in FIG. 10C, |di/dt| within the range 1 is represented by the threshold 1; |di/dt| within the range 2 by the threshold 2; and |di/dt| within the range 3 by the threshold 3.

The ECU 4 determines which threshold value the output increase/decrease rate evaluated in step S94 corresponds to, looks up a rotation correction map shown in FIG. 10D, and determines the rotation correction coefficient. The ECU 4 in turn calculates the product of the target rotation speed of the fuel pump 3 and the resulting rotation correction coefficient to obtain the rotation speed instruction value, thereby controlling the fuel pump 3.

With the third approach, the ECU 4 need not store any map showing a relationship between the rotation correction coefficient and the output increase/decrease rate, but may only store the threshold values of |dI/dt| and the rotation correction coefficients corresponding thereto; consequently, the amount of data the ECU 4 must store can be considerably reduced.

Although the above description of the third approach refers to three threshold values used to evaluate the |dI/dt| for the purpose of illustration, it is understood that the number of threshold values are not restricted to three.

(4) Fourth Approach

In the fourth approach, the |dI/dt| is evaluated by threshold values as in the third approach, and additionally the output instruction value is used to determine the rotation correction coefficient of the fuel pump 3 as in the second approach. At this stage, the rotation correction coefficient determination routine (S95) looks up a rotation correction map shown in FIG. 11A.

Figure 11A:
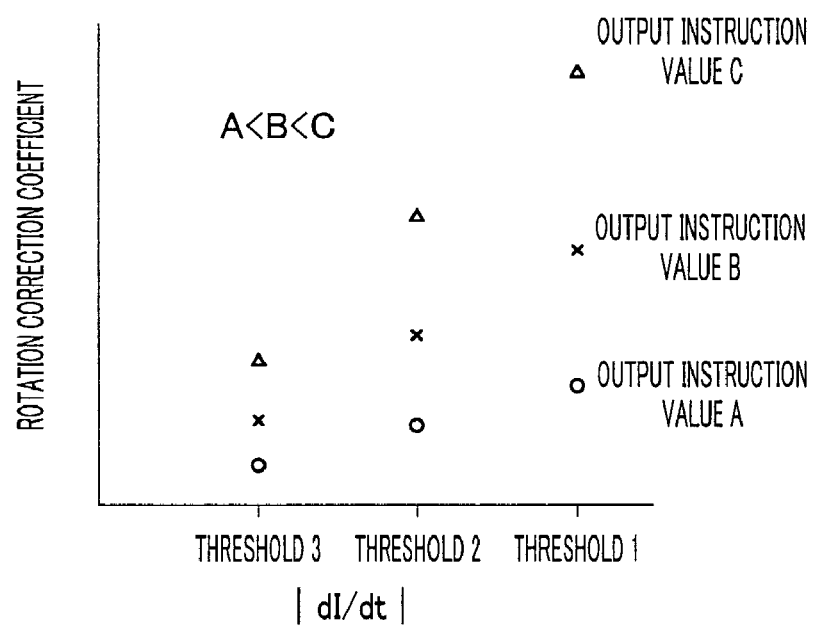
FIG. 11A shows a rotation correction map used in a fourth approach of the rotation correction coefficient determination routine according to the fourth embodiment of the present invention.

FIG. 11A is a graph of which the ordinates denote threshold values of |dI/dt| and the abscissas denote rotation correction coefficients. For each threshold value (threshold 1 through threshold 3), the rotation correction coefficient is uniquely determined by the output instruction value (A through C).

The output instruction values A through C as shown in FIG. 11A are depicted as representative values for the purpose of explanation, and in an actual system, the output instruction values may be set in further subdivided steps.

As described above, the |dI/dt| is evaluated with a number of threshold values, and thereby the amount of data the ECU 4 must store can be reduced. Moreover, since the fourth approach additionally uses the output instruction value to determine the rotation correction coefficient as in the second approach, the time required for the output of the fuel cells to become the output instruction value can be shortened.

Although the above description of FIG. 11A refers to three threshold values used to evaluate the |dI/dt| for the purpose of illustration, it is understood that the number of threshold values are not restricted to three.

(5) Fifth Approach

The fifth approach evaluates the |dI/dt| using threshold values as in the third approach. Difference between the fifth approach and the third approach is seen in the rotation correction map to be looked up to obtain rotation correction coefficients.

Figure 11B:
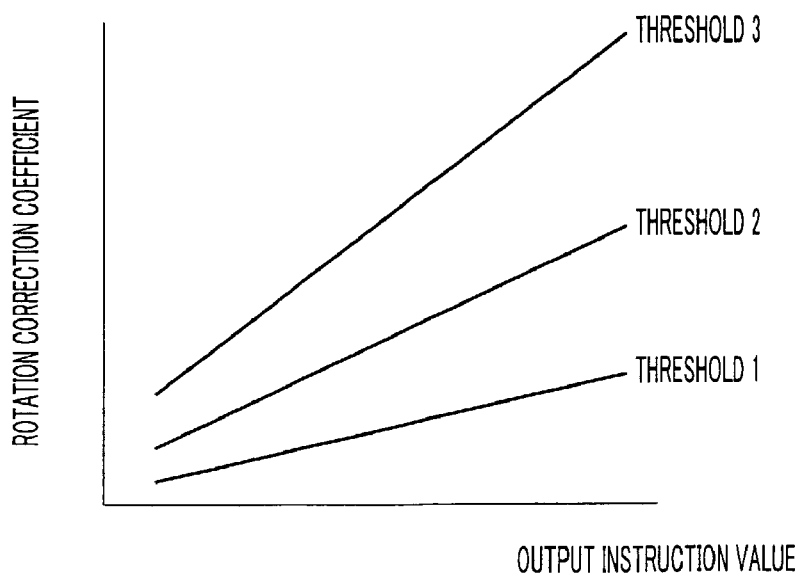
FIG. 11B shows a rotation correction map used in a fifth approach of the rotation correction coefficient determination routine according to the fourth embodiment of the present invention.

In the fifth approach, the rotation correction map as shown in FIG. 11B is used. FIG. 11B is a graph of which the ordinates denote rotation correction coefficients and the abscissas denote output instruction values transmitted to the fuel-circulating fuel cell system. In the graph, there are shown three correction coefficient straight lines corresponding to the threshold values (threshold 1 through threshold 3) shown in FIG. 10C.

The ECU 4 determines from the output increase/decrease rate obtained in step S94 which threshold value the |dI/dt| corresponds to, and selects one of the line to be used to obtain the rotation correction coefficient among the correction coefficient straight lines. Further, the ECU 4 locates and reads out a rotation correction coefficient corresponding to the output instruction value inputted in step S91 for the selected correction coefficient straight line.

Although the above description refers to three threshold values used to evaluate |dI/dt| for the purpose of illustration, it is understood that the number of threshold values are not restricted to three.

(6) Sixth Approach

In the third embodiment, the cell voltage of the fuel cell stack 1 is used to determine the rotation correction coefficient of the fuel pump 3. Accordingly, the third embodiment can reflect the conditions of the fuel cells on the control over the fuel pump 3.

In the fourth embodiment, however, the output increase/decrease rate provided to the fuel cell system is used to control the fuel pump 3, and thus cannot reflect the conditions of the fuel cells (e.g., cell voltage) on the control over the fuel pump 3. For that reason, the sixth approach not only utilizes the output increase/decrease rate to determine the rotation correction coefficient of the fuel pump 3, but also controls an operation time for which the fuel pump 3 performs an accelerated rotation, so that the fuel cell system may be driven more stably. The instant approach corresponds to the seventh aspect of the present invention.

Hereupon, the "accelerated rotation" is a rotation of the fuel pump 3, which is controlled so that the rotation speed of the fuel pump 3 becomes the rotation speed instruction value (=target rotation speed×rotation correction coefficient), when the rotation correction coefficient is greater than one.

Figure 12:
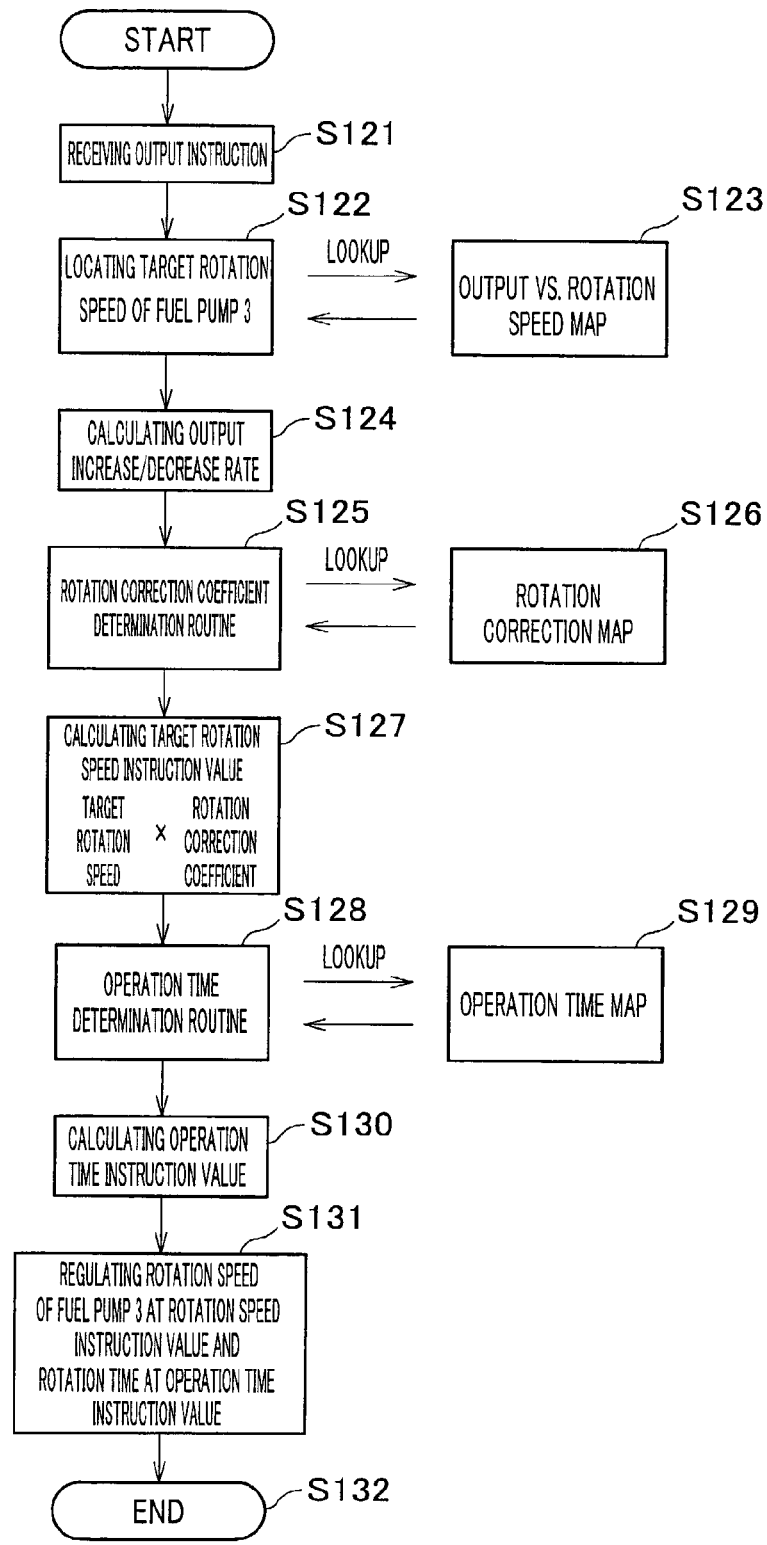
FIG. 12 is a control flowchart of a sixth approach of the fourth embodiment of the present invention.

A control flow of the sixth approach is shown in FIG. 12.

In the control flowchart shown in FIG. 12, steps S121 through S127 are identical with steps S91 through S97 of the control flow of the fourth embodiment shown in FIG. 9, and thus a duplicate description thereof will be omitted herein. It is understood that any one of the aforementioned first, second, third, fourth and fifth approaches may be employed to determine the rotation correction coefficient of the fuel pump 3 in steps S125 and S126

The feature of the sixth approach may be represented in step S128 and subsequent steps. In step S128, the ECU 4 determines the time (operation time instruction value) for which the fuel pump 3 is driven to rotate at a rotation speed corresponding to the rotation speed instruction value determined in step S127. At that time, an operation time determination routine (S128) looks up an operation time map (S129).

Figure 13:
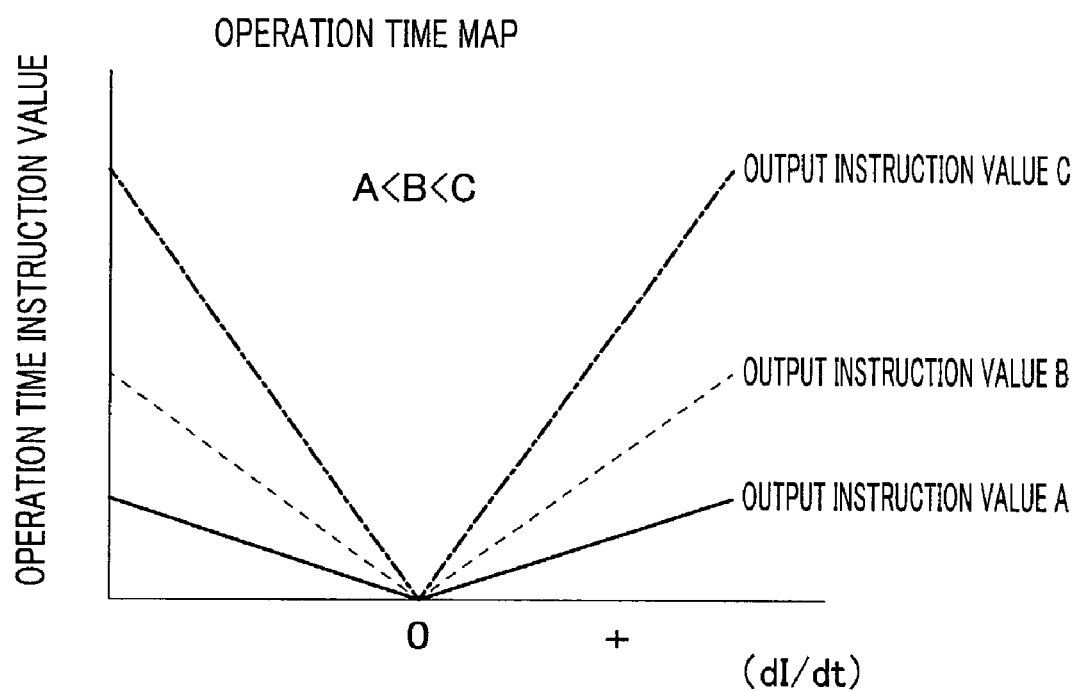
FIG. 13 shows an operation time map used in the sixth approach of the fourth embodiment of the present invention.

An example of the operation time map is shown in FIG. 13. FIG. 13 is a graph of which the ordinates denote operation time instruction values for indicating the operation time for which the fuel pump 3 is driven to rotate at a rotation speed corresponding to the rotation speed instruction value, and the abscissas denote output increase/decrease rates. In FIG. 13, there are drawn three lines for output instruction values A through C taken by way of example. In FIG. 13, as the output instruction value is larger and the absolute value of the output increase/decrease rate is larger, the operation time instruction value becomes larger, i.e., the accelerated rotation time of the fuel pump 3 becomes longer.

The ECU 4 looks up the operation time map, and determines the operation time instruction value corresponding to the time for which the fuel pump 3 performs an accelerated rotation.

According to the thus-determined operation time instruction value and rotation speed instruction value, the fuel pump 3 is controlled within the operation time (S131).

After the time specified by the operation time instruction value has passed, the fuel pump 3 rotates at the target rotation speed determined in step S122.

As described above, with the sixth approach, the control is exerted over the operation time for which the fuel pump performs an accelerated rotation to be determined by the rotation correction coefficient, as well; therefore, the fuel cell system can be driven more stably.

Fifth Embodiment

Figure 14:
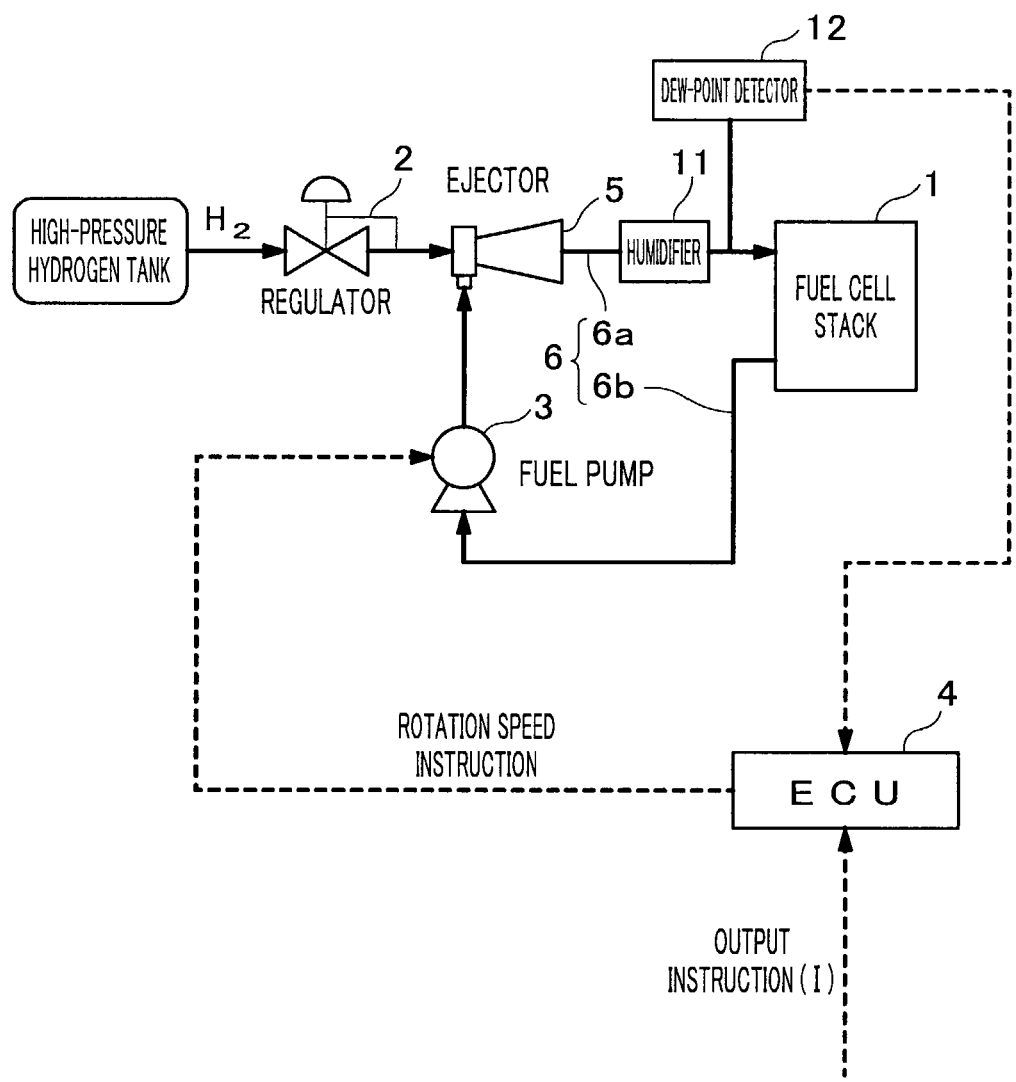
FIG. 14 is a schematic block diagram illustrating a device configuration of a fifth embodiment of the fuel-circulating fuel cell system according to the present invention.

FIG. 14 is a diagram illustrating a fifth embodiment of the fuel-circulating fuel cell system according to the present invention. The fifth embodiment adopts a circulation system that uses a fuel pump and an ejector as a fuel-forwarding device, and corresponds to the second, third, fourth, and fifth aspects of the present invention.

The device configuration of the fifth embodiment is identical with that of the second embodiment (see FIG. 3), except that a humidifier 11 is provided in a fuel-circulating passage 6a, and a dew-point detector 12 for measuring a dew point of circulating hydrogen is provided directly upstream of a fuel cell stack 1 in the fuel-circulating passage 6a, so that the ECU 4 monitors the dew point.

In the fuel-circulating fuel cell system, hydrogen containing a predetermined amount of moisture need be supplied to the fuel cell stack 1; for that purpose, the fuel-circulating passage 6a is equipped with a humidifier 11. However, when an abrupt acceleration instruction is transmitted to the fuel cell system, the amount of moisture generated in the humidifier 11 temporarily does not meet the necessary amount in some instances. In other instances, when an abrupt acceleration/deceleration instruction is transmitted to the fuel cell system under the conditions of no control over hydrogen circulation amount, the amount of hydrogen circulated in the fuel-circulating passage 6 temporarily falls short (see FIG. 21). In these situations, even if the operation of the humidifier is accelerated to generate an increased amount of moisture, the amount of moisture required by the fuel cell stack 1 cannot be satisfied because the circulation rate of hydrogen that carries moisture is reduced.

Meanwhile, hydrogen discharged from the fuel cell stack 1 involves generated water and condensed water in the fuel cell stack 1, and thus is always saturated with moisture. Accordingly, upon an abrupt acceleration/deceleration of the fuel cell system, increasing the circulation rate of hydrogen in the fuel-circulating passage 6 and circulating the hydrogen saturated with moisture discharged from the fuel cell system into the fuel-circulating passage 6a make it possible to circulate moisture required by the fuel cell system. Moreover, in a case where the humidifier 11 is to acquire moisture from the circulating stream of fuel, a temporal moisture deficiency thereof can be covered.

In short, the fifth embodiment exemplifies a fuel-circulating fuel cell system that monitors dew points of hydrogen in the fuel cells, so that the amounts of hydrogen and moisture circulated in the fuel-circulating passage 6 may be secured even when an abrupt acceleration/deceleration instruction is transmitted to the fuel cell system.

Figure 15:
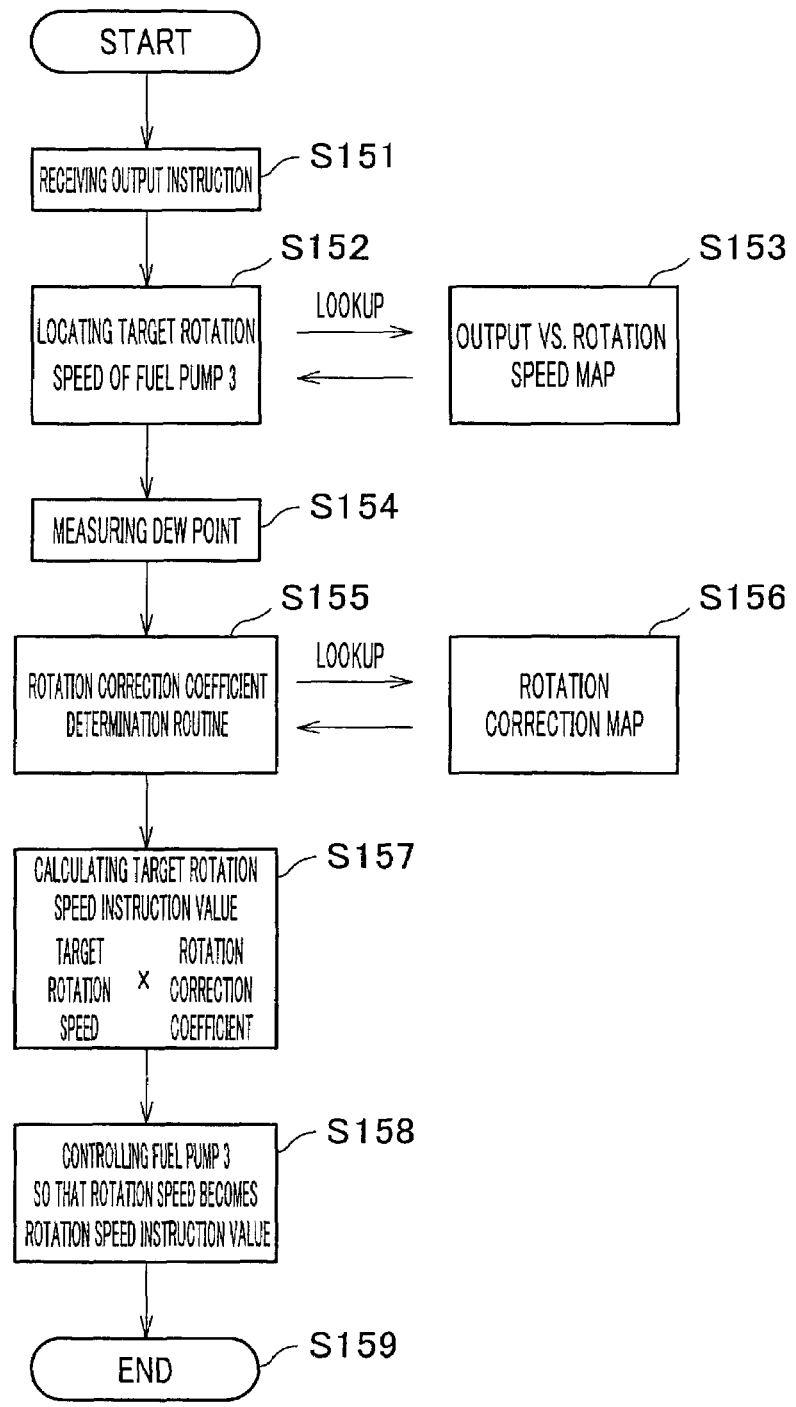
FIG. 15 is a control flowchart of the fifth embodiment of the present invention.

A control flow of the fifth embodiment of the fuel-circulating fuel cell system is shown in FIG. 15.

When an output instruction is transmitted to the fuel-circulating fuel cell system (S151), the ECU 4 looks up the output versus rotation speed map (see FIG. 2B) (S153), and determines a target rotation speed of the fuel pump 3 (S152). Subsequently, the ECU 4 measures a dew point of hydrogen with a dew-point detector 12 disposed directly upstream of the fuel cell stack 1 in the fuel-circulating passage 6a (S154).

The ECU 4 calculates a rotation correction coefficient using the dew point of hydrogen measured in step S154 through the rotation correction coefficient determination routine (S155). At that stage, the rotation correction coefficient determination routine looks up a rotation correction map (as shown in FIG. 16) provided in the ECU 4 in advance (S156).

Figure 16:
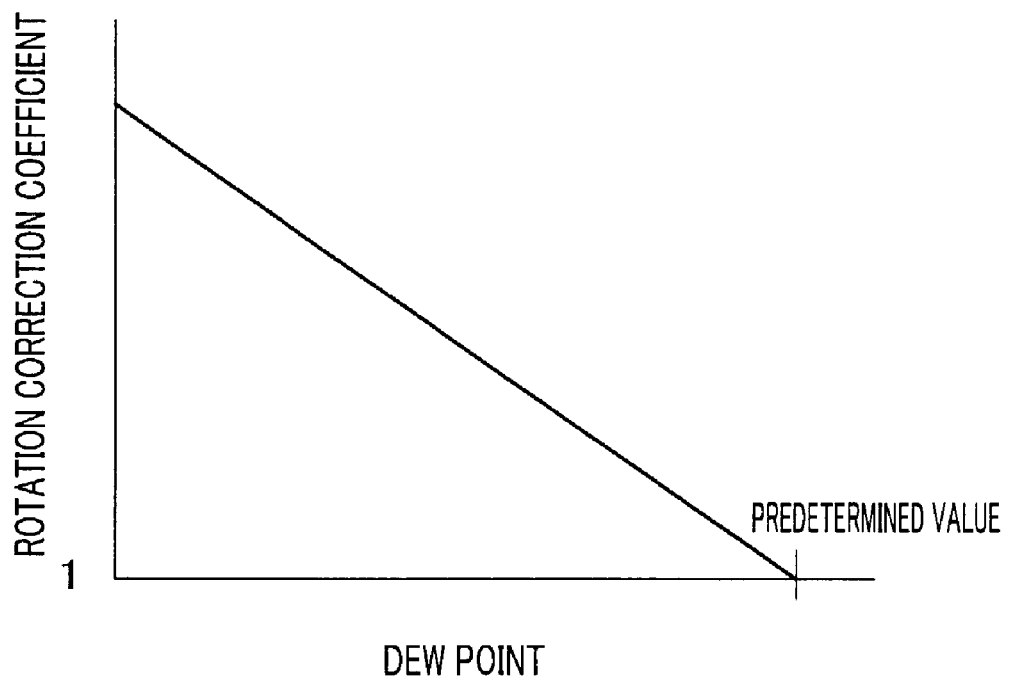
FIG. 16 shows a rotation correction map used in the fifth embodiment of the present invention.

FIG. 16 is a graph of which the ordinates denote rotation correction coefficients and the abscissas denote dew points of hydrogen. If the dew point of hydrogen measured with the dew-point detector 12 is too low, the rotation correction coefficient is increased, so that the rotation speed of the fuel pump 3 is increased to increase the circulation rate of the hydrogen that is saturated with moisture and discharged from the fuel cell stack 1.

Subsequently, the product of the target rotation speed obtained in step S152 and the rotation correction coefficient obtained in step S155 is calculated to acquire a rotation speed instruction value transmitted to the fuel pump 3 (S157).

Next, the ECU 4 controls the fuel pump 3 so that the rotation speed of the fuel pump 3 becomes a rotation speed corresponding to the rotation speed instruction value (S158), and the process terminates (S159).

Although the dew-point detector 12 disposed in the fuel-circulating passage 6a is used to detect a dew point of hydrogen in the present embodiment, a thermometer may be used instead of the dew-point detector 12 to exercise control of the present embodiment, depending upon particular systems, for example, in cases where hydrogen output from the humidifier 11 is saturated with moisture.

It is to be understood that the above process of determining a rotation correction coefficient with a dew point may be performed with consideration given to the output instruction value, and/or by evaluating the dew point using threshold values, as described in the third embodiment and the fourth embodiment respectively, and/or through any other approaches.

Sixth Embodiment

Figure 17:
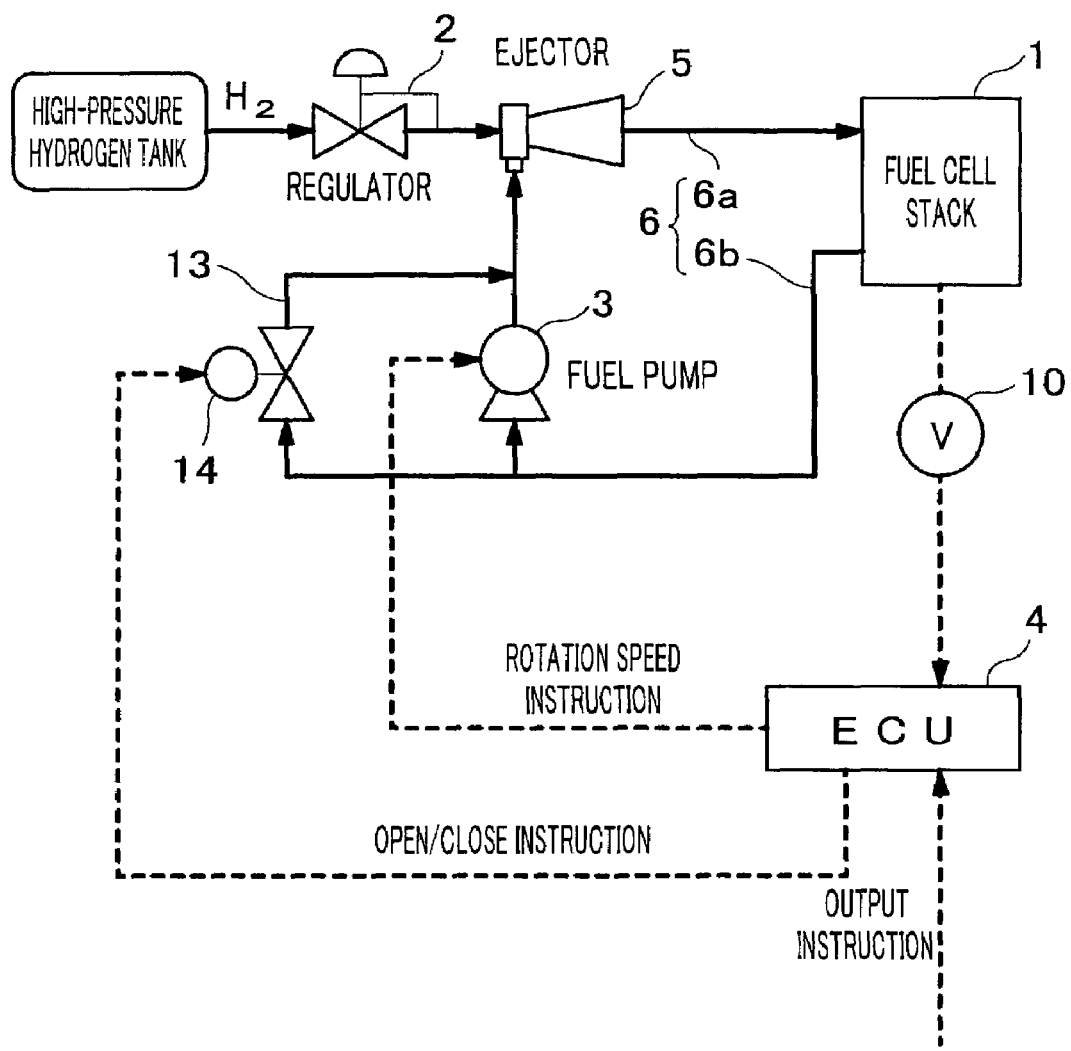
FIG. 17 is a schematic block diagram illustrating a device configuration of a sixth embodiment of the fuel-circulating fuel cell system according to the present invention.

A sixth embodiment of the fuel-circulating fuel cell system is shown in FIG. 17. This embodiment corresponds to the eighth aspect of the present invention.

The feature of the device configuration of the sixth embodiment is that a bypass 13 for detouring round a fuel pump 3 is provided in a fuel-circulating passage 6, and that a bypass valve 14 capable of opening and closing under control of an ECU 4 is provided in the bypass 13. Other elements provided in the sixth embodiment are equivalent to those of the third embodiment (FIG. 5).

In the sixth embodiment, when the fuel cell system is in a normal operating condition, the fuel pump 3 is stopped from operating, or kept waiting (let idle) in a low output condition, and the bypass valve 14 is opened to allow hydrogen to detour round the fuel pump 3 and go to an ejector 5. The hydrogen that has gained circulating momentum from the ejector 5 is circulated through the fuel-circulating passage 6.

When an abrupt acceleration/deceleration instruction is transmitted to the fuel cell system, or a condition level (e.g., a cell voltage, etc.) of the fuel cell system decreases below a predetermined range, the ECU 4, which monitors these conditions, close the bypass valve 14 and rotates the fuel pump 3 at a predetermined rotation speed, thereby increasing the circulation rate of hydrogen in the fuel-circulating passage 6 so as to respond to an output instruction and restore the condition level of the fuel cell to the predetermined range.

Although the cell voltage is used as the condition level of the fuel cell in the sixth embodiment, a dew point of hydrogen, or the like may be evaluated instead.

Figure 18:
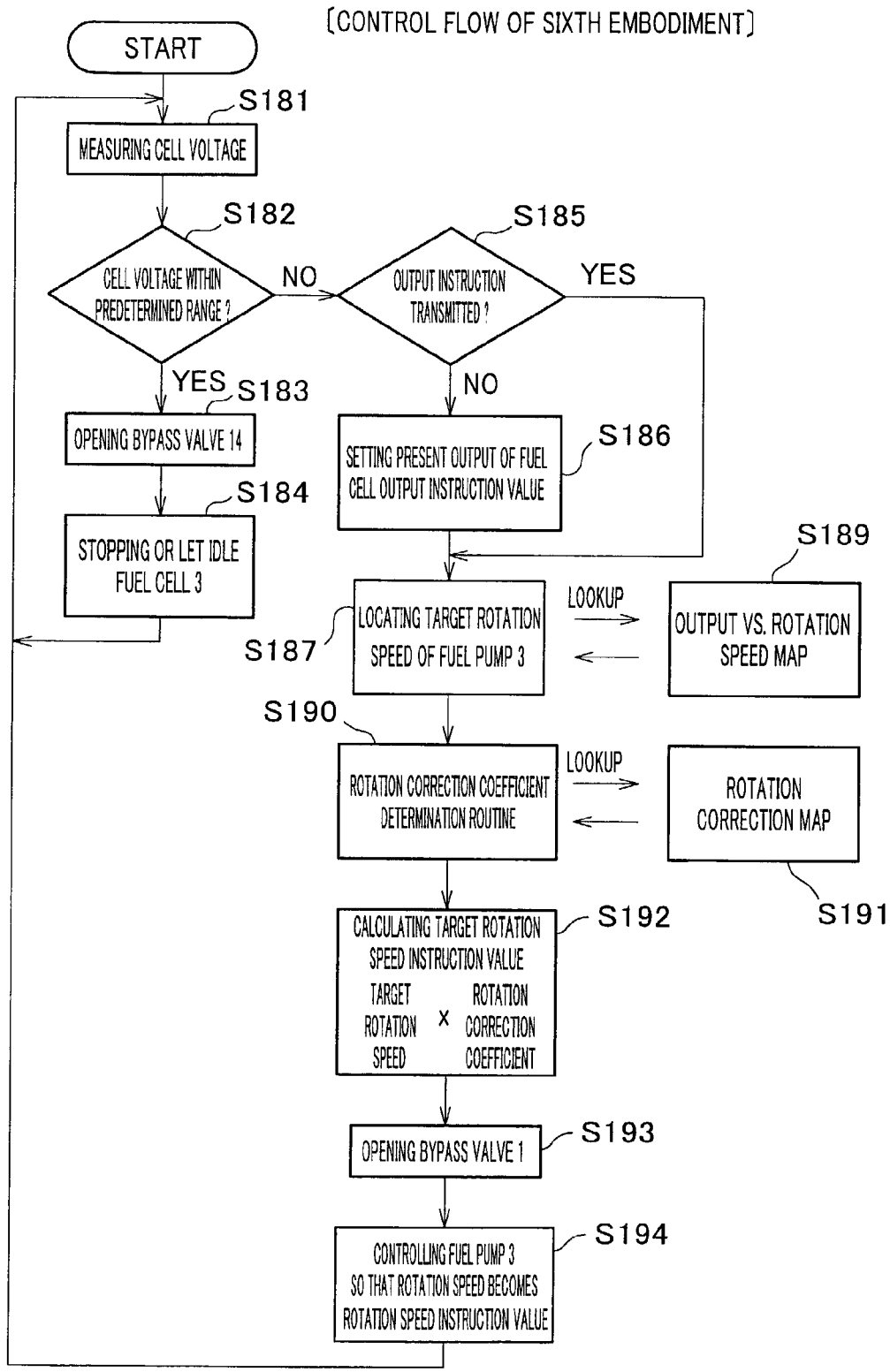
FIG. 18 is a control flowchart of the sixth embodiment of the present invention.

A control flow of the sixth embodiment will be described with reference to FIG. 18.

First, a cell voltage is measured with a voltmeter 10 provided in the fuel cell stack 1 (S181). Subsequently, it is determined whether the cell voltage is within a predetermined range (S182), and if it is determined that the cell voltage falls within the predetermined range (YES), then an open valve instruction is transmitted to the bypass valve 14 (S183), and the fuel pump 3 is stopped from operating (S184). However, if it is determined in step S182 that the cell voltage is below the predetermined range, then the bypass valve 14 is closed, and a process for rotating the fuel pump 3 at a predetermined rotation speed is executed (S185-S194).

To rotate the fuel pump 3 at a predetermined rotation speed, first, it is determined in step S185 whether an output instruction such as an acceleration/deceleration instruction is given to the fuel cell system. If it is determined that the output instruction is given (YES), a target rotation speed of the fuel pump 3 is determined according to the output instruction value in step S1187.

In contrast, if it is determined that the output instruction is not given, then the output instruction value is set at the current output of the fuel cell system (S186) because the target rotation speed of the fuel pump 3 cannot be determined in step S187.

Subsequently, the output versus rotation speed map (FIG. 2B) is looked up (S189), and the target rotation speed of the fuel pump 3 corresponding to the output instruction value is determined.

Further, based upon the cell voltage measured in step S181, the rotation correction map, for example, as shown in FIG. 7A, 7B, 7D, or 8A is looked up (S191), and thereby the rotation correction coefficient determination routine (S190) obtains a rotation correction coefficient that indicates an extra amount of an accelerated rotation of the fuel pump 3.

Thereafter, the product of the target rotation speed and the rotation correction coefficient is calculated to obtain the rotation speed instruction value (S192), and the bypass valve 14 is opened so as to allow hydrogen to flow in the fuel pump 3, which is regulated to rotate at a rotation speed corresponding to the rotation speed instruction value calculated in step S192 (S194). Then, the control process goes back to step S181, and the cell voltage is evaluated again.

A more specific description will be given of a controlling operation of the sixth embodiment of the fuel-circulating fuel cell system with reference to FIG. 19.

Figure 19:
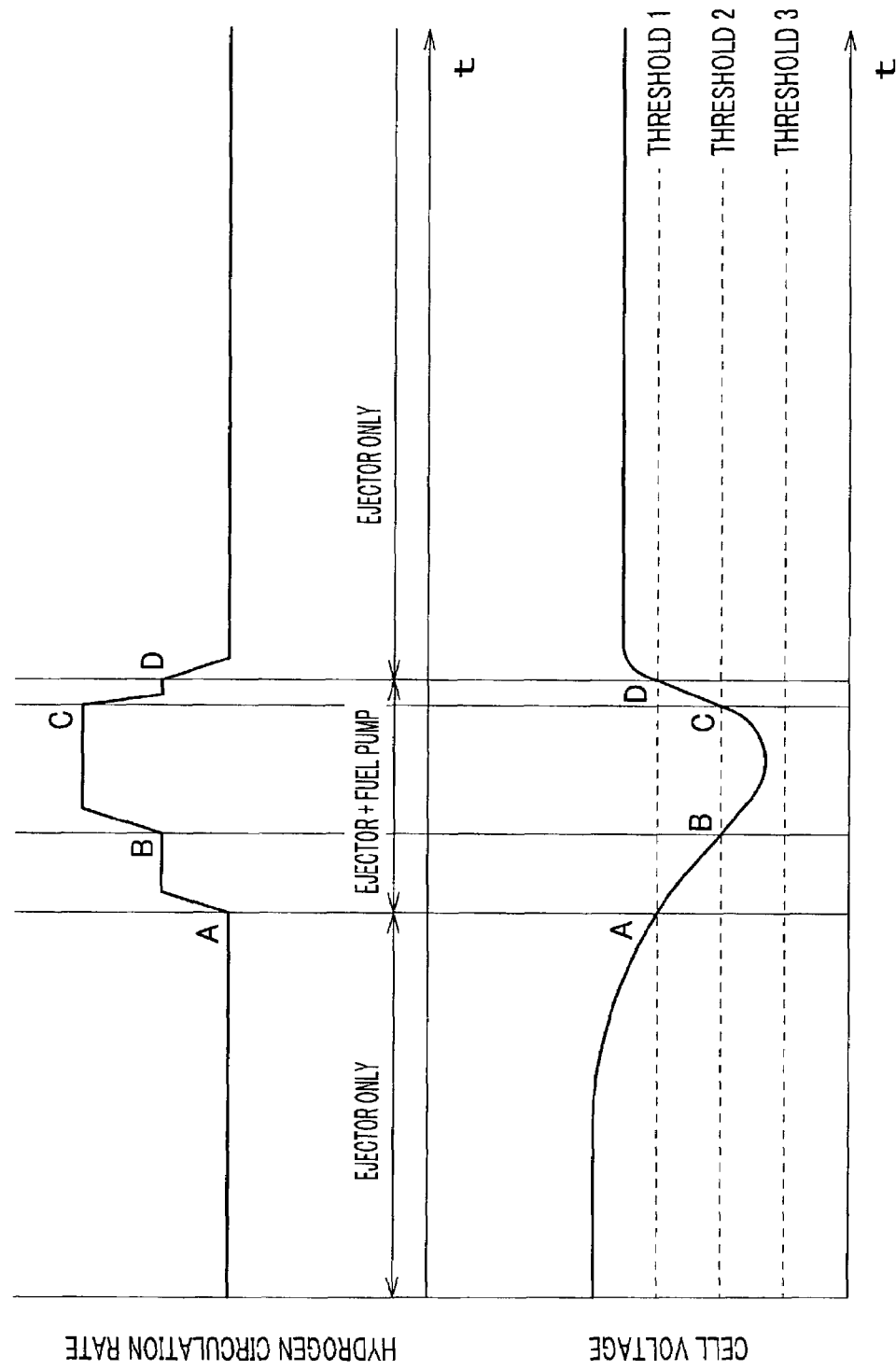
FIG. 19 is a timing chart for explaining a controlling operation of the sixth embodiment of the fuel-circulating fuel cell system according to the present invention.

FIG. 19 is a timing chart showing both of transition of cell voltages of the fuel-circulating fuel cell system according to the sixth embodiment and transition of circulation rates of hydrogen in the system.

Assume that the cell voltage of the fuel cells falls within a predetermined range until the time indicated by point A. During this period, in the fuel cell system in FIG. 17, the fuel pump 3 is stopped or disabled (e.g., let idle), the bypass valve is opened, and hydrogen is circulated in the fuel-circulating passage 6 utilizing the ejector 5 only. If the cell voltage falls below the threshold 1, for example by the influence of condensed water in the fuel cell stack 1, at point A, then the ECU 4, following the control flow as shown in FIG. 18, closes the bypass valve 14, and gives the fuel pump 3 an instruction to rotate at a speed corresponding to the rotation speed instruction value calculated in step S192, so that the rotation speed of the fuel pump 3 increases. As the rotation speed of the fuel pump 3 increases, the amount of hydrogen circulating in the fuel-circulating passage 6 increases.

In this embodiment, however, assume that the fuel cell voltage of the fuel cells is not restored to a value within the predetermined range, and further falls short of the threshold 2 at point B. Then, the ECU 4 further increases the rotation speed of the fuel pump 3 in accordance with the control flow as shown in FIG. 18, so as to further increase the amount of hydrogen circulating in the system. Thereafter, when the cell voltage is restored within the predetermined range while passing through point C and point D, the ECU 4 opens the bypass valve 14, stops or disables the fuel pump 3, and starts circulating hydrogen again with the ejector 5 only.

As described above, in the sixth embodiment, when the condition value of the fuel cells such as a cell voltage falls short of a predetermined range, or when an output instruction is given, the fuel pump 3 is driven to increase the circulation rate of hydrogen in the fuel-circulating passage 6, and otherwise, the fuel pump 3 is stopped or let idle. Therefore, the pump 3 need not be operated all the time, and thus an improved energy economy can be achieved.

Moreover, irrespective of the arrangement of the bypass and the bypass valve of the sixth embodiment, when the condition level of the fuel cell stack 1 falls within a predetermined range and hydrogen required by the system may be circulated with the ejector only, the fuel pump 3 in the fuel-circulating passage 6 may be stopped or let idle, so that energy efficiency of the fuel-circulating fuel cell system may be improved.

Although the preferred embodiments of the present invention have been described above, various modifications and changes may be made in the present invention without departing from the spirit and scope thereof. For example, although a single ejector is provided as a fuel-forwarding device in each embodiment, a plurality of ejectors may be provided, instead.

The present invention is constructed as above, and thus exerts distinctive advantageous effects as follows.

According to the aforementioned first aspect of the present invention, the fuel-forwarding device regulates the amount of fuel circulating in the fuel-circulating passage in response to an output instruction value transmitted to the fuel cells, and thus the amount of fuel circulated to the fuel cells can be prevented from becoming scarce even when an abrupt acceleration/deceleration instruction is transmitted to the fuel cells.

In addition, the fuel pump that is powered from an outside source is used as a fuel-forwarding device under control of the fuel cell controller singly or in combination with the ejector that generates circulating momentum of fuel provided by the pressure in the high-pressure fuel tank. Therefore, even when an abrupt acceleration/deceleration instruction that cannot be responded to by the ejector alone is transmitted to the fuel cells, the amount of fuel required by the fuel cells can be circulated in the fuel-circulating passage by increasing the rotation speed of the fuel pump.

According to the aforementioned second aspect of the present invention, the fuel cell controller including the capability of monitoring a condition level of the fuel cells, and thus may monitor a cell voltage of the fuel cells, a dew point of the fuel, or the like to reflect detected information to the amount of fuel circulated in the fuel-circulating passage.

According to the aforementioned third aspect of the present invention, the fuel cell controller determines a target rotation speed of the fuel pump based upon an output instruction value, and can thus avoid a delay in regulating the circulation rate of the fuel, unlike the case where the rotation speed of the fuel pump is regulated based upon the output of the fuel cells.

According to the aforementioned fourth aspect of the present invention, the fuel cell controller regulates the circulation rate of the fuel with consideration given to a condition level (e.g., a cell voltage, a dew point of the fuel, etc), and can thus increase the circulation rate of the fuel if the condition level falls out of a predetermined range, so that the circulation rate of the fuel indicated by the output instruction value can be secured as the condition level is restored.

According to the aforementioned fifth aspect of the present invention, a cell voltage and/or a dew point of the fuel at an inlet of the fuel cells are used as the condition level of the fuel cells, and thus the circulation rate of the fuel can be regulated with the conditions of the fuel cells given from the condition level.

According to the aforementioned sixth aspect of the present invention, the fuel cell controller regulates the circulation rate of the fuel with consideration given to an output increase/decrease rate, and can thus accelerate the rotation of the fuel pump in accordance with the output increase/decrease rate, so that the circulation rate of the fuel required by the fuel cells can be secured, even when an abrupt acceleration/deceleration instruction is transmitted to the fuel cells.

According to the aforementioned seventh aspect of the present invention, the fuel cell controller determines an operation time of the accelerated rotation of the fuel pump based upon an output increase/decrease rate, and thus an adequate amount of fuel in accordance with the output increase/decrease rate can be circulated in the fuel-circulating passage.

According to the aforementioned eighth aspect of the present invention, a bypass that detours round the fuel pump, and a bypass valve are provided, and thus the fuel pump that requires electric power to operate can be actuated only when necessary. The fuel pump may be driven to operate only when the output instruction is transmitted and/or when the condition level is out of the predetermined range, so that electric power for operating the fuel pump can be saved.

According to the aforementioned ninth aspect of the present invention, when the condition level of the fuel cells falls within the predetermined range, the fuel pump is stopped or let idle, so that energy efficiency of the fuel-circulating fuel cell system may be improved.

What is claimed is:

1. A fuel-circulating fuel cell system comprising:
a fuel cell that is supplied with fuel and an oxidizing agent, and generates electricity;
a fuel-circulating passage that supplies fuel discharged from the fuel cell to the fuel cell again;
a high-pressure hydrogen tank that supplies new fuel to the fuel cell;
a fuel-forwarding device disposed in the fuel-circulating passage and provided with:
   a fuel pump that is powered from an outside source to circulate the fuel in the fuel-circulating passage at a predetermined circulation rate, and
   an ejector that forwards the new fuel from the high-pressure hydrogen tank to the fuel-circulating passage and circulates the fuel in the fuel-circulating passage at the predetermined circulation rate in combination with the fuel pump,
   wherein the fuel pump is disposed in the fuel-circulating passage at a location where the fuel discharged from the fuel cell flows away from the fuel cell and toward the ejector;
means for monitoring a cell voltage of the fuel cell;
means for determining an output instruction value based on the cell voltage of the fuel cell;
means for transmitting the output instruction value to the fuel pump of the fuel-forwarding device to control the output of the fuel cell by controlling the fuel-forwarding device according to the output instruction value, thereby regulating a circulation rate of the fuel in the fuel-circulating passage; and
means for increasing a rotation speed of the fuel pump based upon the output instruction value during operation of the fuel cell, wherein during operation the means for increasing comprises:
   means for rotating the fuel pump at a first rotation speed greater than zero when the cell voltage of the fuel cell falls within a predetermined range; and
   means for increasing the first rotation speed to a second rotation speed greater than the first rotation speed when the cell voltage of the fuel cell falls below the predetermined range.

2. A fuel-circulating fuel cell system according to claim 1, further comprising:
means for determining a target rotation speed of the fuel pump based upon the output instruction value;
means for calculating a rotation correction coefficient based upon the cell voltage of the fuel cell; and
means for controlling the fuel pump so that the fuel pump rotates at the target rotation speed corrected with the rotation correction coefficient.

3. A fuel-circulating fuel cell system according to claim 1, further comprising:
means for determining a target rotation speed of the fuel pump based upon the output instruction value;
means for calculating a rotation correction coefficient based upon the cell voltage of the fuel cell and the output instruction value; and
means for controlling the fuel pump so that the fuel pump rotates at the target rotation speed corrected with the rotation correction coefficient.

4. A fuel-circulating fuel cell system according to claim 1, further comprising:
means for determining a target rotation speed of the fuel pump based upon the output instruction value;
means for obtaining an output increase/decrease rate as a rate of change of the output instruction value with respect to time; and
means for calculating a rotation correction coefficient based upon the output increase/decrease rate; and
means for controlling the fuel pump so that the fuel pump rotates at the target rotation speed corrected with the rotation correction coefficient.

5. A fuel-circulating fuel cell system according to claim 1, further comprising:
means for determining a target rotation speed of the fuel pump based upon the output instruction value;
means for obtaining an output increase/decrease rate as a rate of change of the output instruction value with respect to time; and
means for calculating a rotation correction coefficient based upon the output increase/decrease rate and the output instruction value; and
means for controlling the fuel pump so that the fuel pump rotates at the target rotation speed corrected with the rotation correction coefficient.

6. A fuel-circulating fuel cell system according to claim 4, further comprising:
means for calculating an operation time of the fuel pump based upon the output instruction value and the output increase/decrease rate; and
means for controlling the fuel pump so that the fuel pump rotates during the operation time.

7. A fuel-circulating fuel cell system according to claim 1, wherein the fuel-circulating passage includes:
a bypass that detours around the fuel pump, and
a bypass valve that is operated to open and close based upon the cell voltage of the fuel cell; and
wherein the bypass valve is opened when the cell voltage of the fuel cell falls within the predetermined range, while the bypass valve is closed when the cell voltage of the fuel cell is out of the predetermined range, so that the fuel pump is rotated at the first or second rotation speed according to the cell voltage of the fuel cell.

8. A fuel-circulating fuel cell system according to claim 7, further comprising:
means for stopping the fuel pump when the cell voltage of the fuel cell falls within the predetermined range.

9. A fuel-circulating fuel cell system according to claim 7, further comprising:
means for letting the fuel pump idle when the cell voltage of the fuel cell falls within the predetermined range.

10. A fuel-circulating fuel cell system according to claim 1, wherein the fuel-circulating passage is led away from the fuel cell into a suction chamber of the ejector.

11. A fuel-circulating fuel cell system according to claim 1, wherein the second rotation speed corresponds to a first cell voltage below the predetermined rage, and wherein the means for increasing further comprises:
means for increasing the second rotation speed to a third rotation speed when the cell voltage of the fuel cell falls to a second cell voltage that is lower than the first cell voltage.

12. A fuel-circulating fuel cell system according to claim 11, further comprising:
means for decreasing the third rotation speed to the second rotation speed when the cell voltage of the fuel cell increases from the second cell voltage to the first cell voltage.

* * * * *